US008280384B2

(12) United States Patent
Carlson et al.

(10) Patent No.: US 8,280,384 B2
(45) Date of Patent: Oct. 2, 2012

(54) SYSTEM AND METHOD FOR PREDICTING LOCATION ACCURACY OF A MOBILE UNIT

(75) Inventors: John Carlson, Dulles, VA (US); Martin Alles, Vienna, VA (US); George Maher, Herndon, VA (US); Selcuk Mazlum, Leesburg, VA (US)

(73) Assignee: Andrew LLC, Hickory, NC (US)

( * ) Notice: Subject to any disclaimer, the term of this patent is extended or adjusted under 35 U.S.C. 154(b) by 1125 days.

(21) Appl. No.: 12/019,575

(22) Filed: Jan. 24, 2008

(65) Prior Publication Data

US 2008/0188244 A1 Aug. 7, 2008

Related U.S. Application Data

(60) Provisional application No. 60/899,379, filed on Feb. 5, 2007.

(51) Int. Cl.
*H04W 40/00* (2009.01)

(52) U.S. Cl. .................. 455/446; 455/456.1; 455/456.2; 455/456.3

(58) Field of Classification Search ................ 455/456.1, 455/456.2, 456.3, 446
See application file for complete search history.

(56) References Cited

U.S. PATENT DOCUMENTS

| | | | |
|---|---|---|---|
| 5,715,516 A * | 2/1998 | Howard et al. | ............ 455/422.1 |
| 5,960,341 A | 9/1999 | LeBlanc et al. | |
| 6,871,077 B2 | 3/2005 | Kennedy | |
| 2004/0180671 A1 * | 9/2004 | Spain, Jr. | .................. 455/456.1 |
| 2005/0040968 A1 | 2/2005 | Damarla et al. | |
| 2005/0078033 A1 | 4/2005 | Tamaki et al. | |
| 2005/0243936 A1 | 11/2005 | Agrawala et al. | |
| 2005/0266855 A1 | 12/2005 | Zeng et al. | |
| 2006/0030333 A1 | 2/2006 | Ward et al. | |
| 2006/0240843 A1 | 10/2006 | Spain et al. | |

FOREIGN PATENT DOCUMENTS

WO 0034799 A1 6/2000

\* cited by examiner

*Primary Examiner* — Jean Gelin
*Assistant Examiner* — Amanuel Lebassi
(74) *Attorney, Agent, or Firm* — Duane Morris LLP

(57) ABSTRACT

The location of a wireless mobile device may be estimated using, at least in part, one or more pre-existing Network Measurement Reports ("NMRs") which include calibration data for a number of locations within a geographic region. The calibration data for these locations is gathered and analyzed so that particular calibration points within the geographic region can be determined and associated with a particular set or sets of calibration data from, for example, one or more NMRs. Sets of calibration points may be evaluated as a function of parameters of the calibration data, and a set of calibration points may be selected as a function of a predetermined criteria. Signal reception in the region may be estimated as a function of mobile device location in the region and an approximate statistical accuracy of a signal strength pattern determined as a function of the estimated signal reception. An expected accuracy of a location system may then be modeled in the region as a function of system configuration information and determined approximate statistical accuracy.

18 Claims, 37 Drawing Sheets

3110

PROVIDE CONFIGURATION
INFORMATION
FOR A GEOGRAPHICAL REGION

3120

ESTIMATE EXPECTED PARAMETERS OF NMR
ASSOCIATED WITH A MOBILE DEVICE AT
EACH OF ONE OR MORE CALIBRATION POINTS

3130

FOR EACH CALIBRATION POINT:
(i)   EVALUATE EXPECTED PARAMETERS
(ii)  DETERMINE IF CALIBRATION POINTS SHOULD BE DEFINED CASED ON THE EVALUATION
(iii) ASSIGN GEOGRAPHICAL COORDINATES

PROVIDE CONFIGURATION INFORMATION
FOR A GEOGRAPHIC REGION

3620

ESTIMATE ONE OR MORE EXPECTED PARAMETERS OF A
NMR ASSOCIATED WITH A MOBILE DEVICE AT EACH OF
ONE OR MORE GRID POINTS

3630

DETERMINE EXPECTED ACCURACY OF
A GEOLOCATION SYSTEM

FIG. 36

SYSTEM AND METHOD FOR PREDICTING LOCATION ACCURACY OF A MOBILE UNIT

CROSS REFERENCE TO RELATED APPLICATIONS

The present application claims priority benefit to and hereby incorporates by reference in its entirety co-pending U.S. Provisional Patent Application Ser. No. 60/899,379 filed on 5 Feb. 2007.

BACKGROUND

The present subject matter is directed generally towards a system and method for estimating the location of a wireless mobile device that is in communication with a wireless communications network. More specifically, the present subject matter relates to the problem of estimating the location of a wireless mobile device using information from one or more Network Measurement Reports ("NMRs") which may be generated by a wireless communications network or the mobile device.

As is well known in the art, the use of wireless communication devices such as telephones, pagers, personal digital assistants, laptop computers, anti-theft devices, etc., hereinafter referred to collectively as "mobile devices", has become prevalent in today's society. Along with the proliferation of these mobile devices is the safety concern associated with the need to locate the mobile device, for example in an emergency situation. For example, the Federal Communication Commission ("FCC") has issued a geolocation mandate for providers of wireless telephone communication services that puts in place a schedule and an accuracy standard under which the providers of wireless communications must implement geolocation technology for wireless telephones when used to make a 911 emergency telephone call (FCC 94-102 E911). In addition to E911 emergency related issues, there has been increased interest in technology which can determine the geographic position, or "geolocate" a mobile device. For example, wireless telecommunications providers are developing location-enabled services for their subscribers including roadside assistance, turn-by-turn driving directions, concierge services, location-specific billing rates and location-specific advertising.

Currently in the art, there are a number of different ways to geolocate a mobile device. For example, providers of wireless communication services have installed mobile device location capabilities into their networks. In operation, these network overlay location systems take measurements on radio frequency ("RF") transmissions from mobile devices at base station locations surrounding the mobile device and estimate the location of the mobile device with respect to the base stations. Because the geographic location of the base stations is known, the determination of the location of the mobile device with respect to the base station permits the geographic location of the mobile device to be determined. The RF measurements of the transmitted signal at the base stations can include the time of arrival, the angle of arrival, the signal power, or the unique/repeatable radio propagation path (radio fingerprinting) derivable features. In addition, the geolocation systems can also use collateral information, e.g., information other than that derived for the RF measurement to assist in the geolocation of the mobile device, i.e., location of roads, dead-reckoning, topography, map matching, etc.

In a network-based geolocation system, the mobile device to be located is typically identified and radio channel assignments determined by (a) monitoring the control information transmitted on radio channel for telephone calls being placed by the mobile device or on a wireline interface to detect calls of interest, i.e., 911, (b) a location request provided by a non-mobile device source, i.e., an enhanced services provider. Once a mobile device to be located has been identified and radio channel assignments determined, the location determining system is first tasked to determine the geolocation of the mobile device and then directed to report the determined position to the requesting entity or enhanced services provider.

The monitoring of the RF transmissions from the mobile device or wireline interfaces to identify calls of interest is known as "tipping", and generally involves recognizing a call of interest being made from a mobile device and collecting the call setup information. Once the mobile device is identified and the call setup information is collected, the location determining system can be tasked to geolocate the mobile device.

While the above-described systems are useful in certain situations, there is a need to streamline the process in order to efficiently and effectively handle the vast amount of data being sent between the wireless communications network and the large number of mobile devices for which locations are to be determined. In this regard, the present subject matter overcomes the limitations of the prior art by estimating the location of a wireless mobile device using, at least in part, one or more pre-existing Network Measurement Reports ("NMRs") which include calibration data for a number of locations within a geographic region. The calibration data for these locations must be gathered and analyzed so that particular points (e.g., "grid points") within the geographic region can be determined and associated with a particular set or sets of calibration data from, for example, one or more NMRs. Then, the received signal level measurements reported by the mobile device to be geolocated may be compared with the data associated with the various grid points to estimate the location of the mobile device. The performance of a grid-based pattern matching system such as that disclosed herein is typically dependent on stored received signal level measurements that accurately reflect the levels that are likely to be reported by the mobile device to be located. These grid points do not necessarily have to be part of a uniform grid and usually will not be uniformly distributed throughout the geographic region. These non-uniform grid points ("NUGs"), once determined, can be assigned geographic coordinates so that the NUGs may be used in determining the location of a mobile device exhibiting certain attributes as discussed in more detail below.

Accordingly, an embodiment of the present subject matter provides a method for assigning geographical coordinates to a grid point located in a geographic region for the location of a mobile device where the method provides calibration data for each of one or more calibration points in the geographic region and where for each of the calibration points the associated calibration data is evaluated and based on that evaluation a determination is made as to whether at least one grid point should be defined, and if so, geographical coordinates are assigned to the grid point.

An additional embodiment of the present subject matter further includes in the above method a determination of geographical coordinates for each of a plurality of nodes of a uniform grid spanning the geographic region and for each of the grid points determining a closest node from the plurality of nodes and assigning characteristic data associated with the grid point to the closest node.

A further embodiment includes a method of assigning geographical coordinates to a grid point located in a geographic region for the location of a mobile device where calibration data for each of one or more calibration points in the geographic region are provided, and where for the calibration data associated with each of the calibration points the calibration data is evaluated, a determination is made based on the evaluation as to whether at least one grid point should be defined, and geographical coordinates are assigned to the grid point.

In another embodiment of the present subject matter, a system for assigning geographical coordinates to a grid point located in a geographic region is presented where the system includes a database and a processor for receiving calibration data for each of one or more calibration points in the geographic region and for each of the calibration points the processor is programmed to evaluate the associated calibration data, determine if at least one grid point should be defined based on the evaluation, assign geographical coordinates to the at least one grid point, and populate the database with the geographical coordinates.

A further embodiment of the present subject matter includes in the above system circuitry for determining geographical coordinates for each of a plurality of nodes of a uniform grid spanning the geographic region, and circuitry for determining, for each of the at least one grid point, a closest node from the plurality of nodes and assigning characteristic data associated with the grid point to the closest node.

One embodiment of the present subject matter provides a method of predicting an expected accuracy of a location system in a geographic region. The method may comprise the steps of providing configuration information for the geographic region and estimating signal reception in the region as a function of mobile device location in the region. The method may further comprise determining an approximate statistical accuracy of a signal strength pattern as a function of the estimated signal reception in the region, and modeling an expected accuracy of the location system in the region as a function of the configuration information and determined approximate statistical accuracy.

Another embodiment of the present subject matter provides a method of assigning geographical coordinates to a calibration point located in a geographic region for the location of a mobile device. The method may comprise the steps of providing configuration information for a geographic region and estimating one or more expected characterizing parameters of a network measurement report associated with a hypothetical mobile device at each of one or more calibration points in the geographic region. For each of the calibration points, the expected characterizing parameters may be evaluated and the method determines if at least one calibration point should be defined based on the evaluation and assigns geographical coordinates to the at least one calibration point.

A further embodiment of the present subject matter may provide a method for generating a model for deployment of a geolocation system in a geographic region. The method may comprise the steps of providing configuration information for the geographic region and estimating signal parameters in the region as a function of mobile device location in the region. The method may further comprise determining an approximate statistical accuracy of a signal pattern as a function of the estimated signal parameters in the region, and modeling an expected accuracy of the geolocation system in the region as a function of the configuration information and determined approximate statistical accuracy.

Yet another embodiment of the present subject matter may provide a method of determining an expected location accuracy of a geolocation system in a geographic region. The method may comprise the steps of providing configuration information for a geographic region and estimating one or more expected characterizing parameters of a network measurement report associated with a hypothetical mobile device at each of one or more grid points in the geographic region. The method may further comprise determining an expected accuracy of the geolocation system in the geographic region as a function of at least one estimated parameter.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

FIGS. 31-32 are flow charts for methods of assigning geographical coordinates to a calibration point located in a geographic region for the location of a mobile device according to embodiments of the present subject matter.

FIGS. 36-37 are flow charts for methods of determining an expected location accuracy of a geolocation system in a geographic region according to embodiments of the present subject matter.

DETAILED DESCRIPTION

Figure 1:
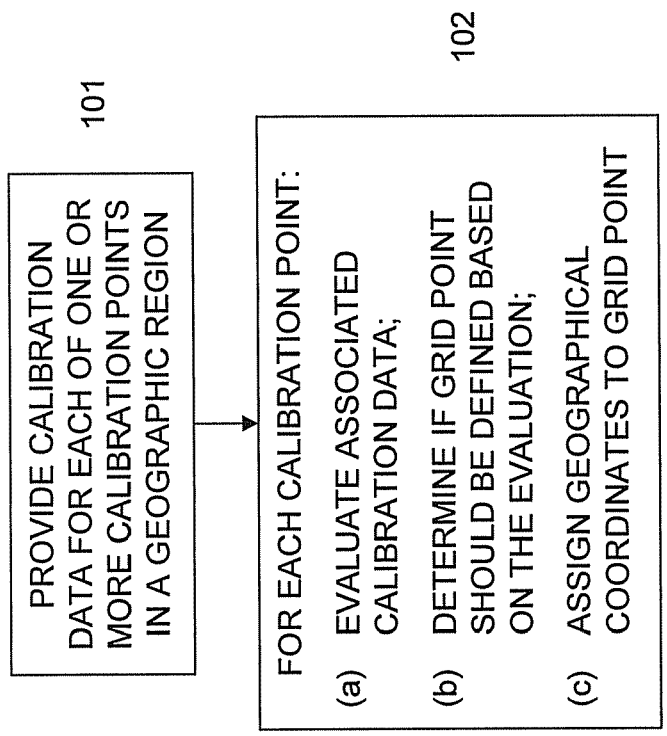
FIG. 1 is a flow chart for a method for assigning geographical coordinates according to an embodiment of the present subject matter.

With reference to the Figures where generally like elements have been given like numerical designations to facilitate an understanding of the present subject matter, the various embodiments of a system and method for predicting location accuracy of a mobile unit are herein described.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that some of the desired benefits of the present subject matter can be obtained by selecting some of the features of the present subject matter without utilizing other features. Accordingly, those who work in the art will recognize that many modifications and adaptations of the present subject matter are possible and may even be desirable in certain circumstances and are part of the present subject matter. Thus, the following description is provided as illustrative of the principles of the present subject matter and not in limitation thereof. While the following exemplary discussion of embodiments of the present subject matter may be directed primarily towards calibration data, it is to be understood that the discussion is not intended to limit the scope of the present subject matter in any way and that the principles presented are equally applicable to other types of data, e.g., signal strength, GPS, NMR, Cell-ID, TDOA, RTT, TA, AOA, etc., capable of being delivered by components in a communications network such as a base station, location measurement unit, other mobile devices, etc. In addition, the use of various combinations of all of these sources, as in a hybrid location scheme, is within the scope of the subject matter disclosed herein.

The present subject matter is directed generally to the problem of estimating the location of a wireless mobile device using calibration data contained in one or more Network Measurement Reports ("NMRs"). The calibration data for various points must be gathered and analyzed so that particular points (e.g., "grid points") within the geographic region can be determined and associated with a particular set or sets of calibration data from, for example, one or more NMRs. In order to do so geographic coordinates may be assigned to grid points located in a geographic region. The grid points may be non-uniformly spaced throughout the geographic region and hence may be referred to as non-uniform grid points ("NUGs"). The location of a wireless mobile device may be estimated by comparing data reported by the mobile device to be geolocated with the data (and more particularly the characteristics derived from this data) associated with the various grid points to thereby estimate the location of the mobile.

The system and/or method of the present subject matter may apply to the situation where calibration data is available over discrete points in a 2-dimensional region "R" (3-D region is also contemplated such as within large multi-level structures). The calibration data may be contained within a Network Measurement Report ("NMR") as is known in the art or the calibration data may be obtained using other known methods. The calibration data may be obtained at each of several calibration points, which may be discrete points within region R each having geographical coordinates (e.g., latitude and longitude) associated therewith. The calibration data may include, but is not limited to, the following: (a) signal strengths observed for signals transmitted by a set of transmitters of known location within or in proximity to the region R; (b) signal strength of a transmitter located at the calibration point as measured by a set of receivers of known location within or in proximity to the region R; (c) round trip time for a signal between the calibration point and an external known point; (d) time difference of arrival at the calibration point with respect pairs of external points located within or in proximity to region R as measured by either a receiver at the calibration point or the external points; (e) the serving cell or sector for a mobile wireless device operating at that calibration point; (f) the network state at the time of collection—a finite number of such states may be required to distinguish between network conditions that vary diurnally, weekly or in some other manner; and (g) combinations of the above.

As a non-limiting example, the case in (a) may apply to the Integrated Digital Enhanced Network ("IDEN") specification, (c) may apply to the Global System for Mobile communications ("GSM") specification as in the Timing Advance ("TA") parameter or the Round Trip Time ("RTT") parameter in the Universal Mobile Telecommunications System ("UMTS") specification, (d) may apply to the UMTS specification, while the external receivers may be the base stations. In general, the calibration data may be any of those measurements made by a mobile wireless device located at the calibration point or any measurement made on the transmissions or characteristics of the mobile wireless device at a set of external transmitter/receivers in the region R or in proximity thereto.

The calibration data may consist of many such sets (i.e., vectors) obtained at one or more calibration points. At each calibration point, the data gathering may have resulted in either a single data vector or multiple data vectors, so that there are potentially multiple sets of data and/or data vectors associated with each calibration point.

A NUG generator or a method to produce NUGs may begin the NUG generation operation using, for example, one or more of the following: (a) a fixed uniform grid ("UG") defined over the region R with the calibration point data being assigned to the fixed grid points by some rule (e.g., allocated by closest fixed grid point, a centroid of a set of fixed grid points, etc.); (b) random grid points to define the start of each NUG; (c) combinations of (a) and (b) depending on the characteristics of the calibration data; or (d) some other useful method.

In any of these cases, the NUG generator may evaluate the data vectors at a particular (candidate) calibration point, or at a fixed grid point to which the data vector(s) is/are assigned. This calibration point or grid point may serve as the root of a first NUG. The root of the NUG may be the calibration data vector that initiates the creation of that NUG. The vectors may be examined using, for example, increasingly stringent tests of statistical sufficiency. In particular, a determination may be made as to whether the data vectors exhibit clustering. If the data exhibits tight clustering, the data for the next candidate calibration point may be aggregated to the former calibration point and the clustering property may be re-evaluated. For example, if the second calibration point also has a cluster but this cluster is sufficiently different than the cluster of the first calibration point, a determination may be made that the data for the two considered calibration points should be allocated to the roots of separate NUGs. If the aggregate cluster (i.e., a cluster including data from both the first and second calibration points) is statistically very similar to either of the first or second clusters (taken independently), then the data for the two calibration points may be allocated to the same NUG. All adjacent calibration data points may be similarly evaluated with respect to the first considered calibration point. Thus one or more of the adjacent calibration points may either wind up having all their data accumulated into a single NUG or, at the other extreme, each such calibration point may become the root of a separate NUG.

The primary test made to determine the allocation may be one of a variety of clustering tests, such as, for example, the K-means algorithm. Statistical similarity may be determined by, for example, the probability density function ("pdf") of the data parameters (e.g., neighboring cell signal levels, timing information, etc.), the mean and variance of the data parameters, the serving cell/sector, or other functions of the calibration data.

Those measurements or parameter values that do not cluster may be referred to as outliers. The performance of a grid-based pattern matching system such as that disclosed herein is typically dependent on stored received signal level measurements that accurately reflect the levels that are likely to be reported by the mobile device to be located. If the drive test data, for example, used to create the RF signal level grid contains outlier measurements, the statistically consistent value of the signal level will be distorted. Therefore, the present subject matter also describes a system and method used to identify and eliminate outlier signal level measurements and timing advance values (or in general, any parameter within the NMR) during NUG or grid creation so as to improve the estimate of the mean parameter value.

As a non-limiting example, in a very simple consideration of clustering one could consider the mean value of a parameter. In this scenario, neighbor cell control channel signal level measurement outliers could be eliminated as follows: At each grid point, the average received signal level of a particular control channel signal may be computed from all of the measurements of that signal assigned to the grid point. The deviation of each individual measurement from the mean may be computed. Measurements that deviate by more than a configurable predetermined threshold from the mean may be omitted. The average may then be recomputed without the omitted outliers. In a scenario where there are very few measurements, typically less than five or so, the original mean value will be greatly influenced by any outlier measurements and thus may falsely identify too many of the measurements as outliers, or fail to detect outliers at all. For this reason, another parameter is used to only perform the outlier check if there are at least a minimum number of measurements.

In a more general case, a cluster may be a region in N-dimensional NMR vector space where there is a sufficient number of such vectors with a mutual variation such that the mutual variation could be ascribed purely to noise in the measurement. Thus, for example, if within a few feet of the original measurement, if a particular parameter is blocked (say by a large structure such as a building) that parameter would fall out of the original cluster. If sufficient such blocked locations have data falling near the original cluster, one may obtain a secondary cluster where the difference between the first and second clusters is the large variation in this particular parameter.

In addition, if any of the examined sets of data associated with a calibration point exhibit more than one cluster, it may be necessary to define one or more co-located NUGs. Thus, if there are, for example, three well defined clusters associated with a particular calibration point, these clusters could form the roots of three co-located NUGs. The data in these NUGs may grow depending on whether similar clusters can also be found in adjacent (or close) calibration points in which case the similar clusters may be aggregated to the original NUGs or, if the adjacent clusters are not similar, the adjacent clusters (or cluster) may form separate root NUGs (or NUG).

Further, if the quantity of data associated with a particular calibration point is insufficient to sensibly test for statistical similarity or clustering, data from adjacent calibration grid points may be accumulated first and the statistical or clustering test performed thereafter. Thus, based on the results of the clustering test using the accumulated data the determination of how one should separate out the data into NUGs may be made.

The technique may be repeated until all calibration grid points in the region R are exhausted. At the end of this process one has divided the region into a collection of NUGs, where multiple co-located NUGs may exist. The NUGs may fully cover the region R and each NUG may have statistically similar data accumulated into itself. The geometrical shape (i.e., the shape defined by the union of locations of calibration points assigned to the NUG) and the amount of data accumulated into such NUGs is seen to be variable since these are determined by the statistical similarity of the data allocated to a NUG.

Additionally, we may also consider the method of generating NUGs based not on statistical consistency of calibration data, but on other conditions such as (a) a minimum number of unique neighbors observed in data accumulated from allocated calibration grid points; (b) a minimum number of data vectors (NMRs); (c) a maximum and/or minimum NUG radius; (d) a specific set of neighboring cells; (e) a specific set of neighboring cells with power ordering; or (f) any combination of the above. Additionally, the method of using statistical consistency or similarity or data clustering combined with any of these other conditions may be employed.

For each so obtained NUG, a variety of parameters and functions may be generated and stored to describe that NUG. These are termed the NUG characteristics. The NUG characteristics are a representation in that attempt to capture the nature and variability of the data associated with that NUG in a compact and representative form. These characteristics may include, but are not limited to, the following: (a) an ordered list of neighboring cells; (b) functions defined on the absolute neighboring cell power levels (e.g., mean, median, $k^{th}$ moment, cluster-mean, etc.); (c) functions defined on the relative neighboring cell power differences (e.g., mean, median, $k^{th}$ moment, cluster-mean, etc.); (d) serving cell/sector; (e) timing advance parameter (or equivalent); (f) individual pdf (probability density function or probability distribution function) of each neighboring cell power level; (g) joint pdf of neighboring cell power levels; (h) mean and variance of neighboring cell power levels; (i) mobile device orientation (e.g., indoors, outdoors, direction mobile device is facing (e.g., North, South, etc.), tilted upwards, azimuth, elevation, etc.); (j) a compact and/or efficient representation that enables retrieval of the calibration data NMR vectors assigned to this NUG; (k) the network state as indicated in the calibration data; (l) a confidence measure indicative of the reliability of the calibration data feeding this NUG; and (m) any combinations of the above.

If a pdf is determined for a NUG, that pdf may be generated using either the Parzen technique or the method of Gaussian mixtures or some variant thereof. In addition when a need to specify the variance or covariance exists, that parameter may be set to a value dependent on the observed variance for a particular neighboring cell power level or the observed covariance matrix for a set of neighboring cell power levels.

The location ascribed to the NUG may be, for example, any internal point within the NUG. If the NUG contains only a single calibration point, the location of the NUG may be set as the location of the calibration point. If the NUG encompasses several calibration points, the location of any one of the calibration points or the centroid of such calibration points or some other similar measure may be used to define the NUG location. Also, in the case of multiple co-located NUGs, all such NUGs may have their assigned location set to the same value.

With reference now to FIG. 1, a flow chart is depicted for a method for assigning geographical coordinates according to an embodiment of the present subject matter. At block 101, calibration data may be provided for each of one or more calibration points in a geographic region. At block 102, for each of the calibration points calibration data associated with the calibration point is evaluated and a determination is made as to whether a grid point, such as a NUG, should be defined. If it is determined that a grid point is to be defined, geographical coordinates are assigned to the grid point so that the grid point may be useful in estimating the location of a mobile device.

Figure 2:
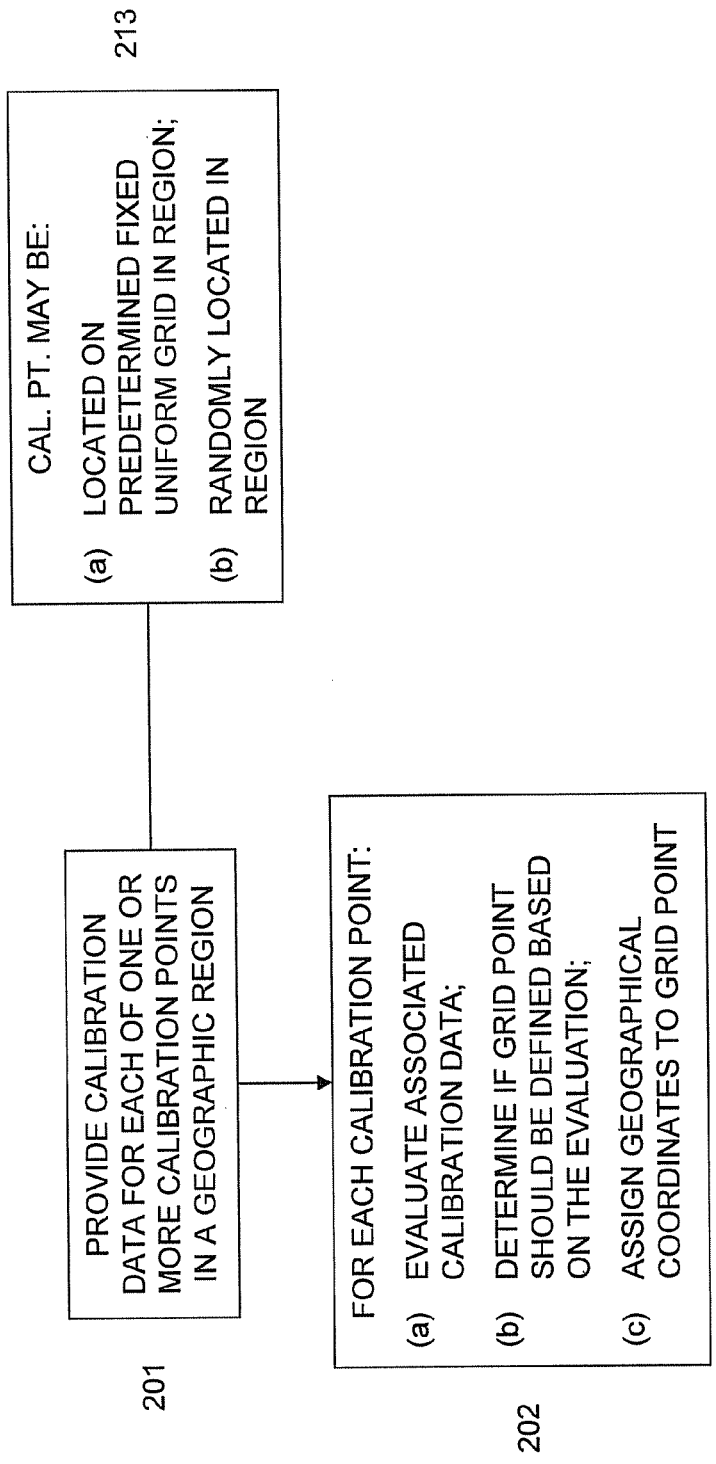
FIG. 2 is a flow chart for a method for assigning geographical coordinates including a calibration point according to an embodiment of the present subject matter.

FIG. 2 is a flow chart for a method for assigning geographical coordinates including a calibration point according to an embodiment of the present subject matter. Blocks 201 and 202 are similar to blocks 101 and 102, respectively. At block 213, the calibration point may be located on a predetermined fixed uniform grid defined over the geographic region or the calibration point may be randomly located within the geographic region.

Figure 3:
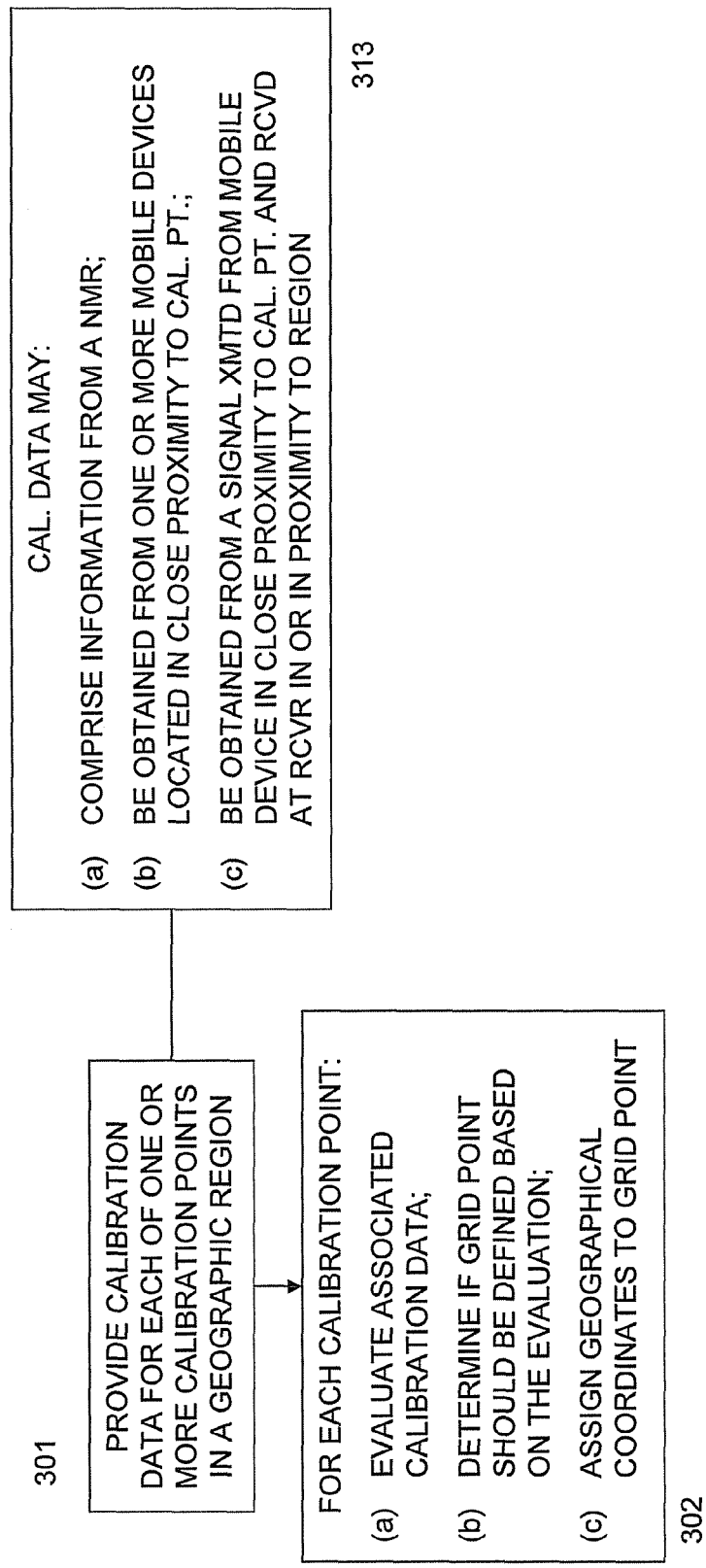
FIG. 3 is a flow chart for a method for assigning geographical coordinates including calibration data according to an embodiment of the present subject matter.

FIG. 3 is a flow chart for a method for assigning geographical coordinates including calibration data according to an embodiment of the present subject matter. Blocks 301 and 302 are similar to blocks 101 and 102, respectively. At block 313, the calibration data associated with one or more calibration points may be comprised of information from a NMR, or the calibration data for a particular calibration point may be obtained from one or more mobile devices located at or in close proximity to the calibration point, or the calibration data for a particular calibration point may be obtained from a signal transmitted from a mobile device (or devices) located at or in close proximity to the calibration point where the signal is received by a receiver in or in proximity to the geographic region.

Figure 4:
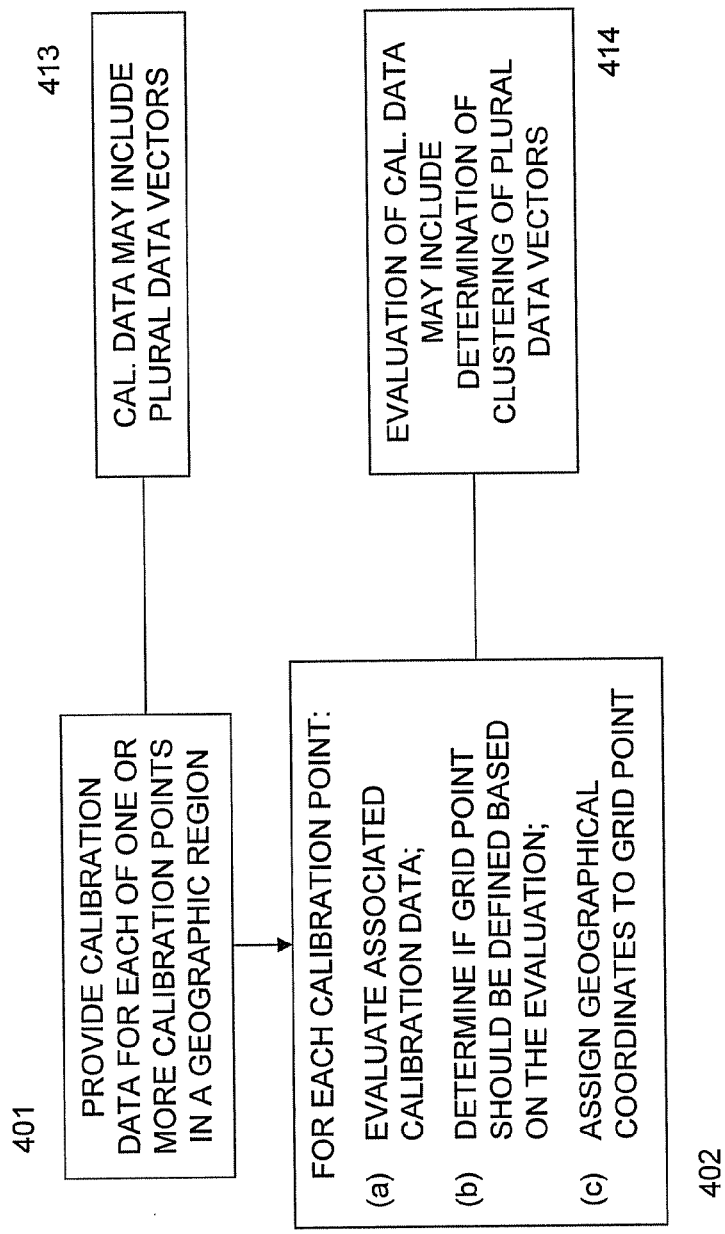
FIG. 4 is a flow chart for a method for assigning geographical coordinates including clustering of data according to an embodiment of the present subject matter.

FIG. 4 is a flow chart for a method for assigning geographical coordinates including clustering of data according to an embodiment of the present subject matter. Blocks 401 and 402 are similar to blocks 101 and 102, respectively. At block 413, for one or more of the calibration points the calibration data may include multiple data vectors and, at block 414, the evaluation of the data vectors may include a determination of clustering of the multiple data vectors as described above.

Figure 5:
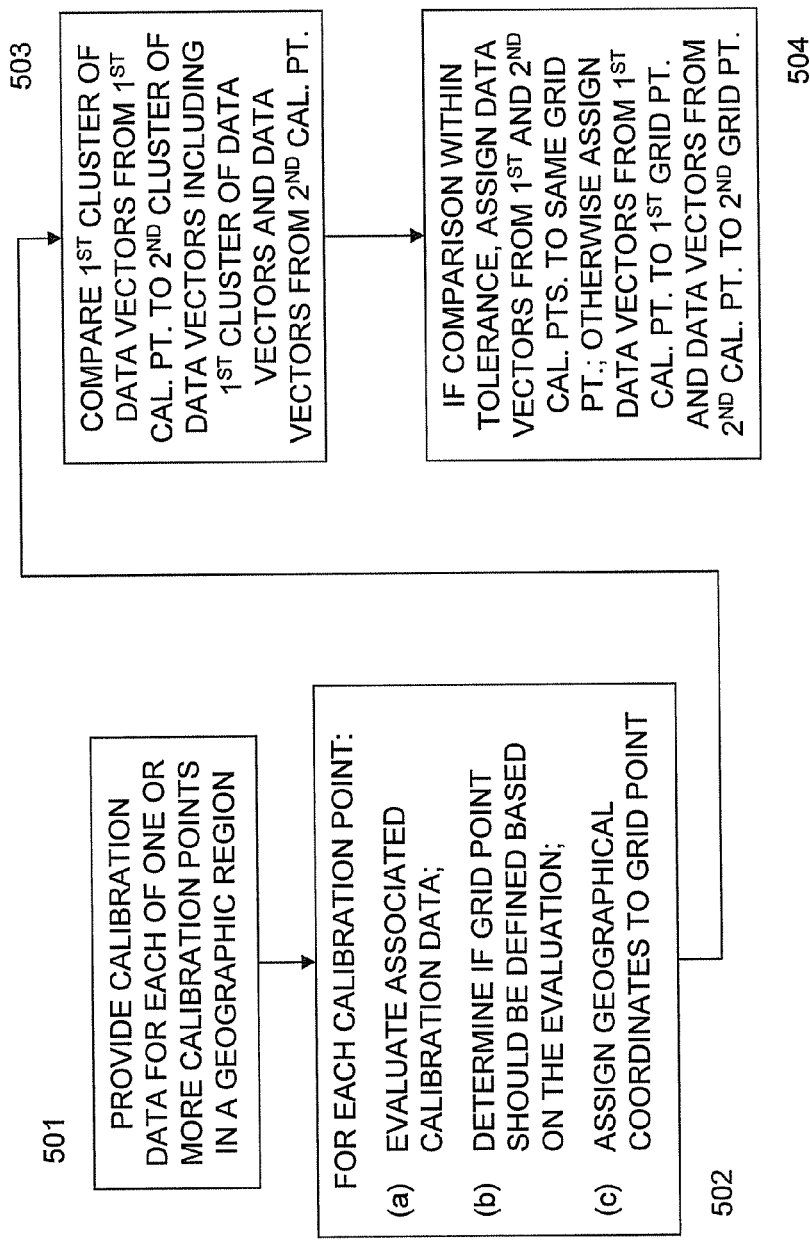
FIG. 5 is a flow chart for a method for assigning geographical coordinates including clustering of data vectors according to an embodiment of the present subject matter.

Considering now the flow chart depicted in FIG. 5, the flow chart indicates a method for assigning geographical coordinates including clustering of data vectors according to an embodiment of the present subject matter. Blocks 501 and 502 are similar to blocks 101 and 102, respectively. At block 503, the determination of whether at least one grid point should be defined based on the evaluation of the calibration data associated with a calibration point includes a comparison of a first cluster of data vectors from a first calibration point to a second cluster of data vectors where the second cluster of data vectors includes the first cluster of data vectors as well as data vectors from a second calibration point. At block 504, if the comparison in block 503 results in the difference between the first and second cluster of data vectors being within a predetermined tolerance value, then the data vectors from the first and second calibration points are assigned to the same grid point. However, if the comparison is not within tolerance, then the data vectors from the first calibration point are assigned to a first grid point and the data vectors from the second calibration point are assigned to a second grid point.

Figure 6:
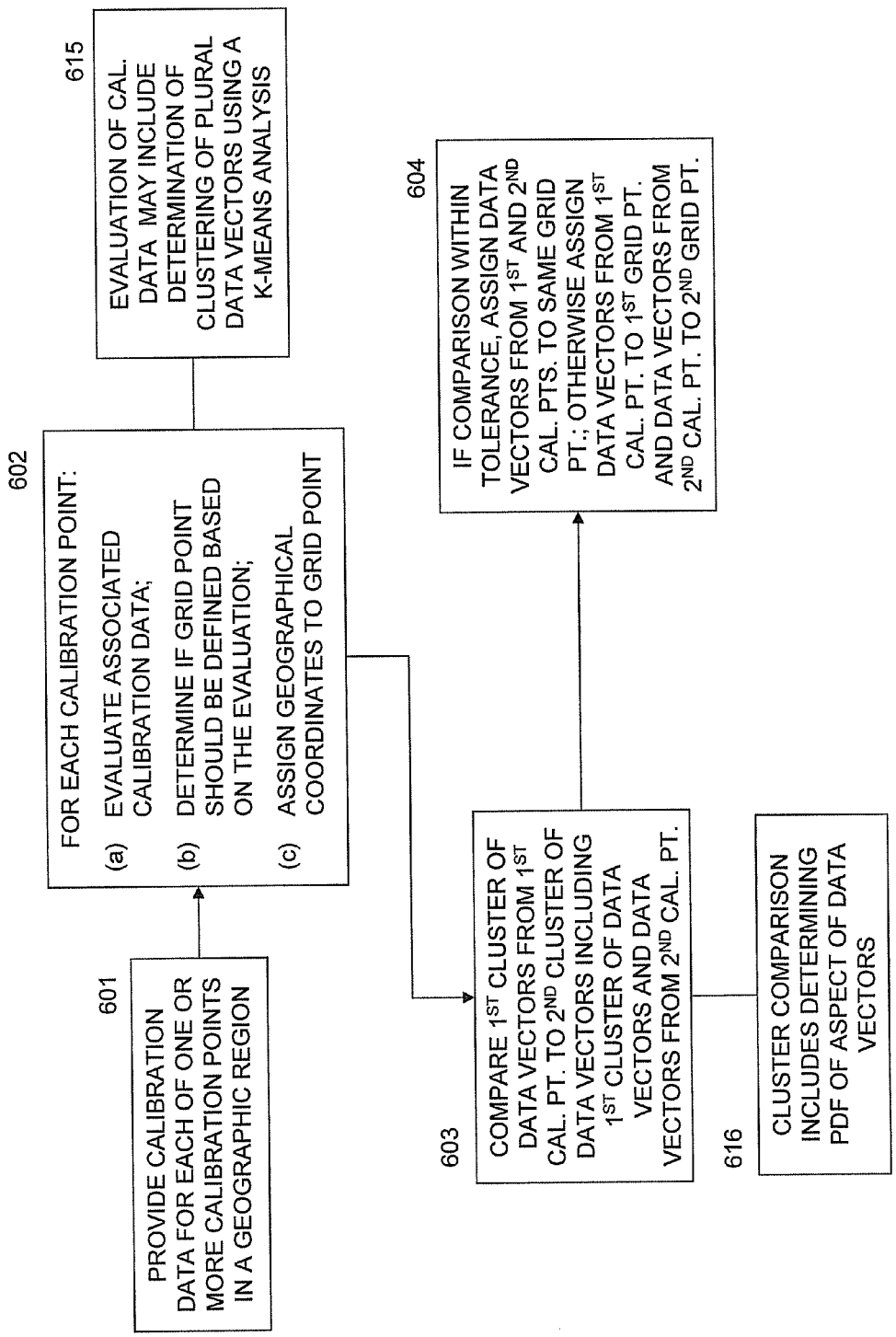
FIG. 6 is a flow chart for a method for assigning geographical coordinates including clustering according to an embodiment of the present subject matter.

The flow chart shown in FIG. 6 illustrates another method for assigning geographical coordinates including clustering according to an embodiment of the present subject matter. Here, blocks 601, 602, 603, and 604 are similar to blocks 501, 502, 503, and 504, respectively. At block 615 the evaluation of calibration data for one or more calibration points may include determining the clustering of plural data vectors using a K-means analysis. At block 616 the comparing of clusters of data vectors may include determining a probability density function of an aspect of the data vectors.

Figure 7:
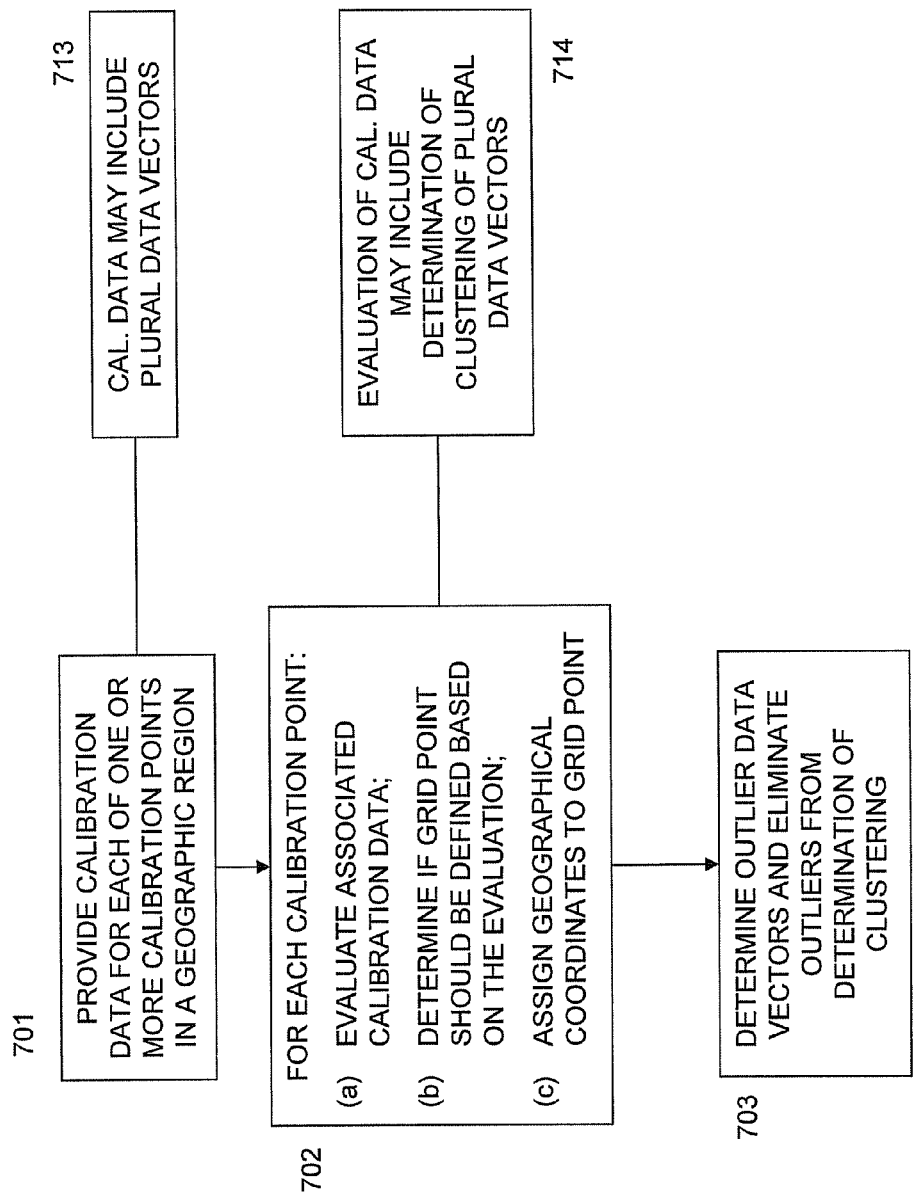
FIG. 7 is a flow chart for a method for assigning geographical coordinates including determining outliers according to an embodiment of the present subject matter.

FIG. 7 is a flow chart for a method for assigning geographical coordinates including determining outliers according to an embodiment of the present subject matter. Blocks 701, 702, 713, and 714 are similar to blocks 401, 402, 413, and 414, respectively. At block 703, a determination of outlier data vectors may be made and the outlier data vectors may be eliminated from the determination of data vector clustering.

Figure 8:
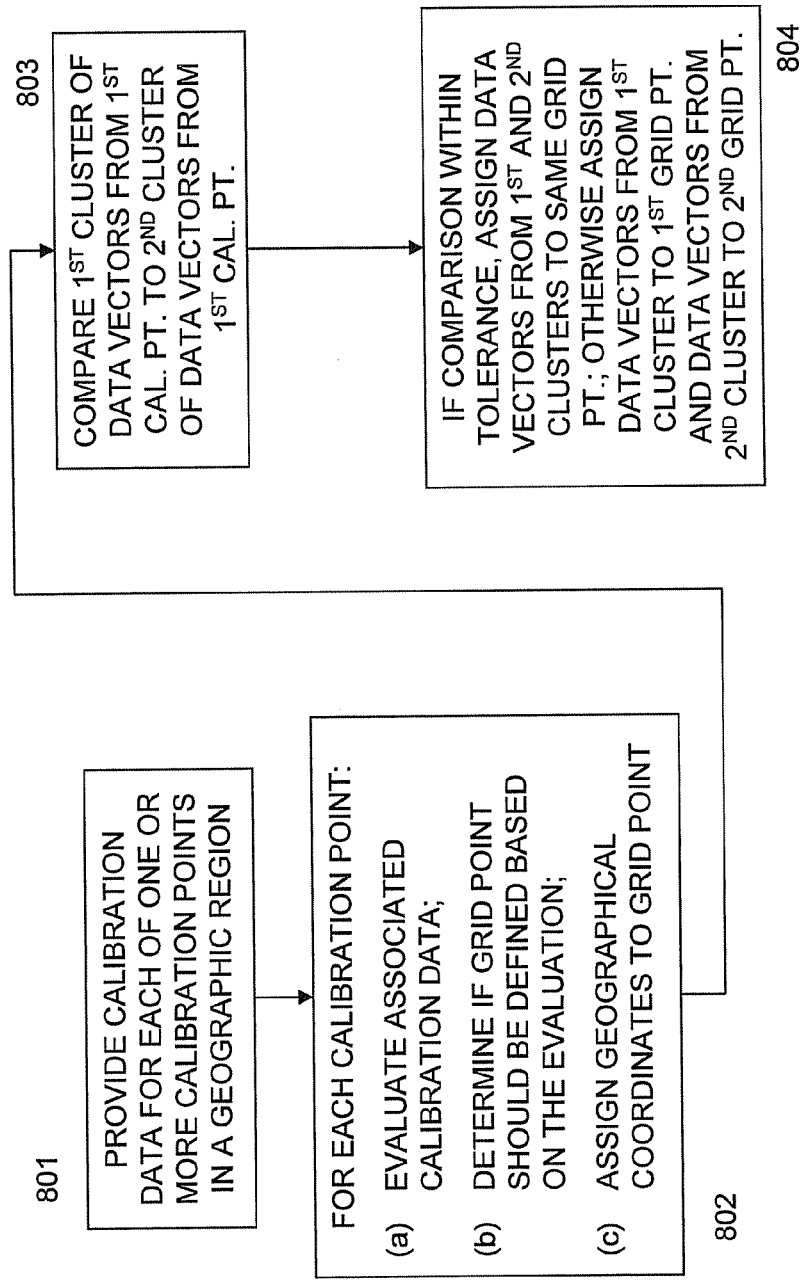
FIG. 8 is a flow chart for a method for assigning geographical coordinates including clustering of data vectors at the same calibration point according to an embodiment of the present subject matter.

Regarding FIG. 8, a flow chart is represented for a method for assigning geographical coordinates including clustering of data vectors at the same calibration point according to an embodiment of the present subject matter. Blocks 801 and 802 are similar to blocks 101 and 102, respectively. At block 803, the determination if at least one grid point should be defined based on the evaluation of calibration data may include a comparison of a first cluster of data vectors associated with a first calibration point to a second cluster of data vectors associated with the first calibration point. If the result of the comparison is within a predetermined tolerance, then the data vectors from the first and second clusters may be assigned to the same grid point; otherwise, the data vectors from the first cluster may be assigned to a first grid point while the data vectors from the second cluster may be assigned to a second grid point.

Figure 9:
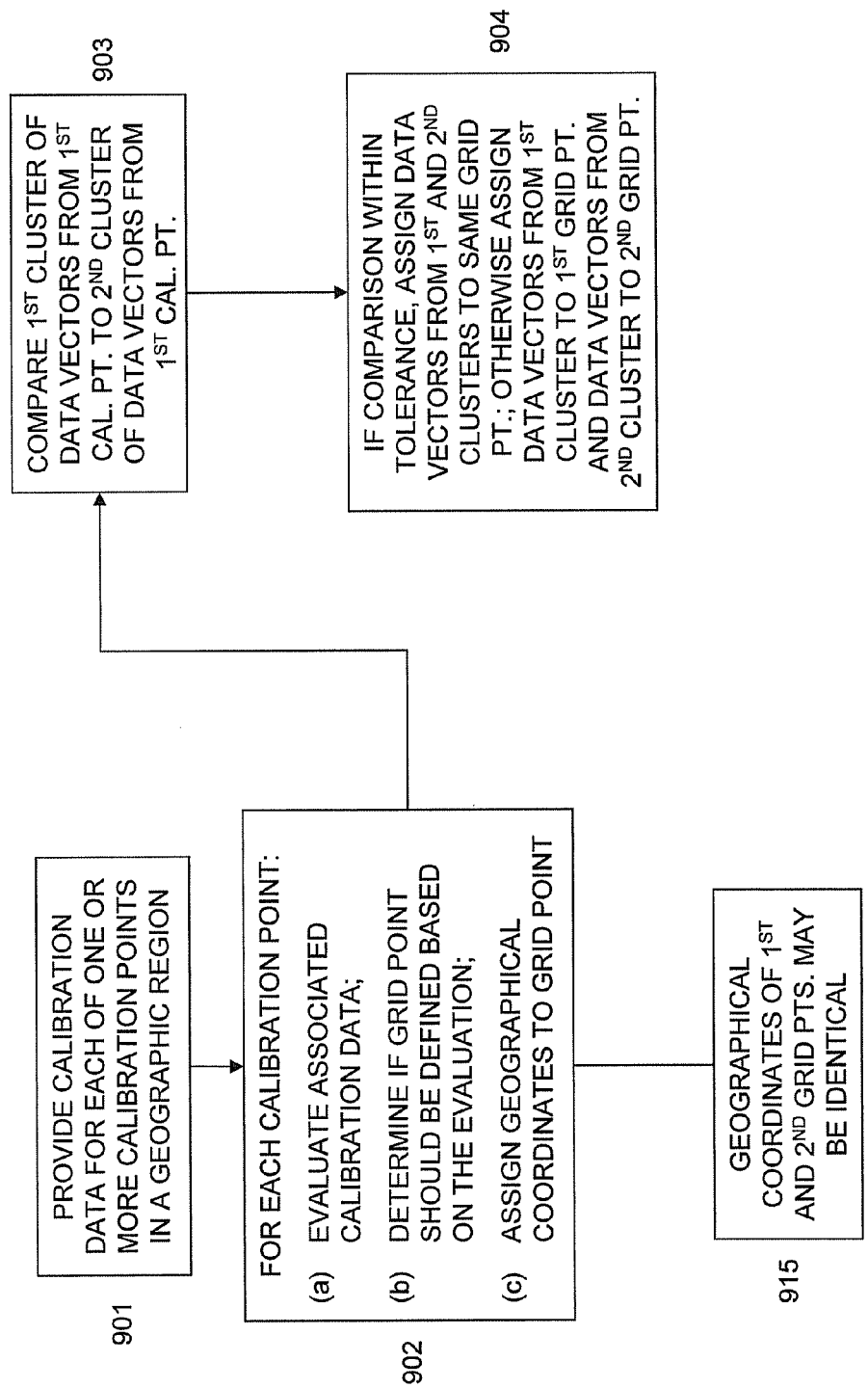
FIG. 9 is a flow chart for a method for assigning geographical coordinates including clustering of data vectors at the same calibration point according to an embodiment of the present subject matter.

FIG. 9 is a flow chart illustrating another method for assigning geographical coordinates including clustering of data vectors at the same calibration point according to an embodiment of the present subject matter. Here, blocks 901, 902, 903, and 904 are similar to blocks 801, 802, 803, and 804, respectively. At block 915 the geographical coordinates assigned to the first and second grid points may be identical.

Figure 10:
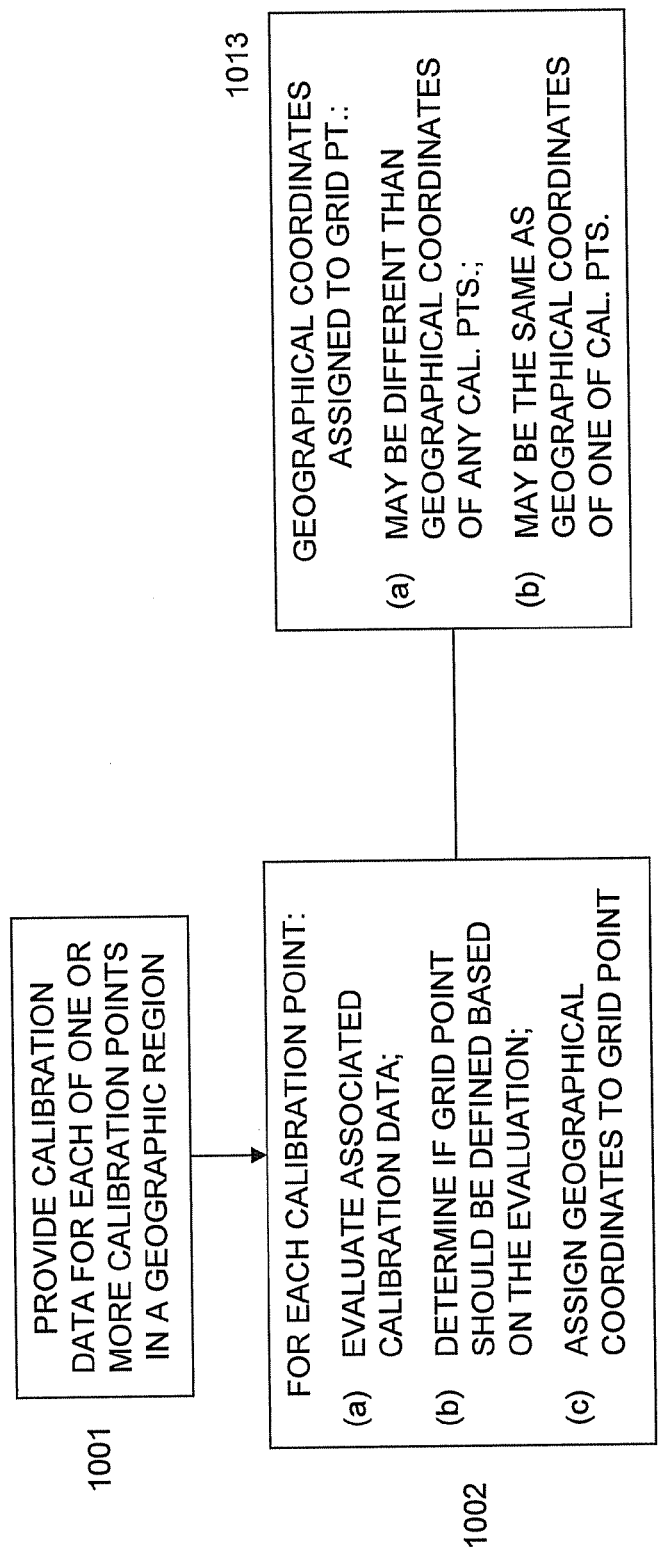
FIG. 10 is a flow chart for a method for assigning geographical coordinates to a grid point according to an embodiment of the present subject matter.

Directing attention now towards FIG. 10, a flow chart is presented for a method for assigning geographical coordinates to a grid point according to an embodiment of the present subject matter. Blocks 1001 and 1002 are similar to blocks 101 and 102, respectively. At block 1013, the geographical coordinates assigned to a first grid point may be different than the geographical coordinates assigned to a second grid point or the geographical coordinates assigned to a first grid point may be the same as the geographical coordinates assigned to a second grid point.

Figure 11:
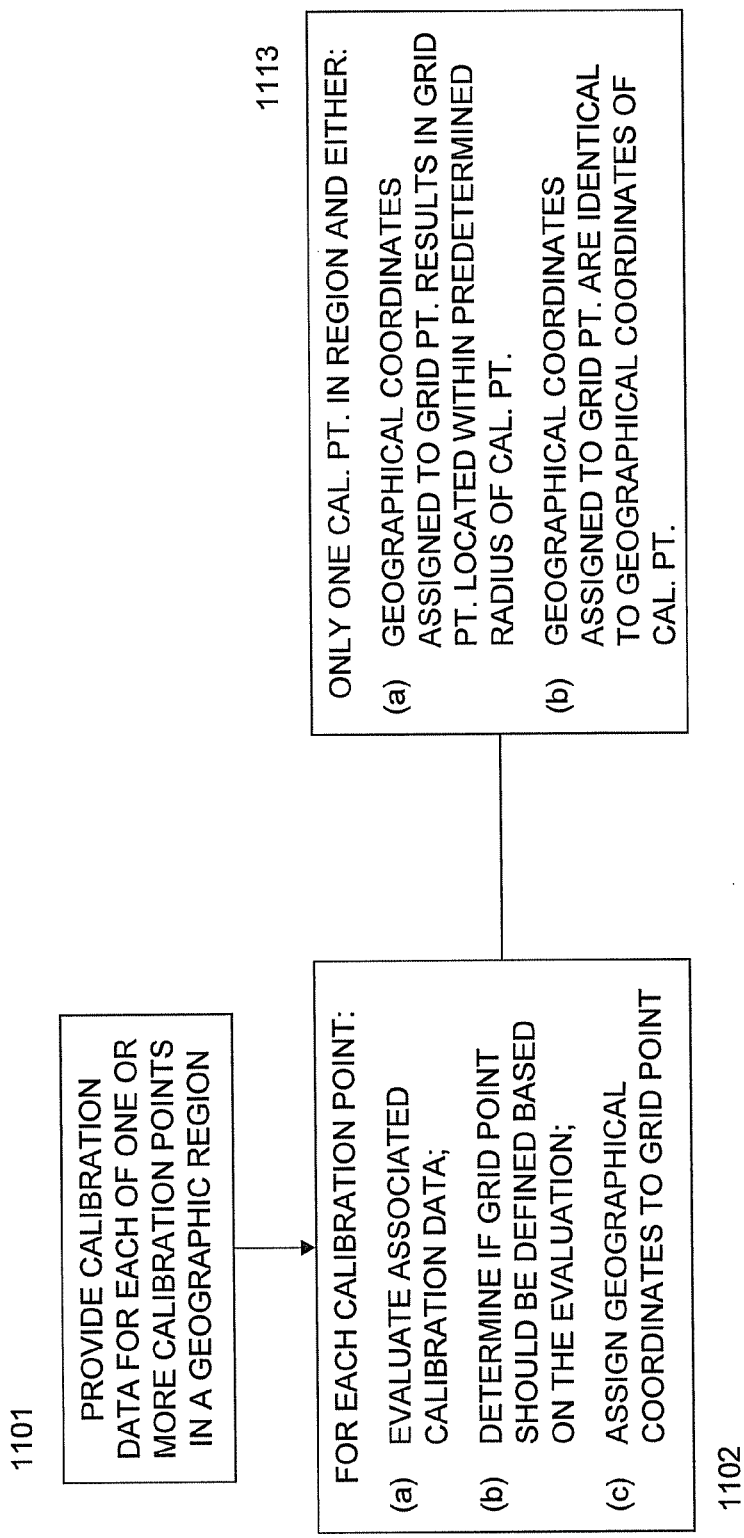
FIG. 11 is a flow chart for a method for assigning geographical coordinates including assigning geographical coordinates to a grid point where only one calibration point is in a geographic region according to an embodiment of the present subject matter.

FIG. 11 is a flow chart for a method for assigning geographical coordinates including assigning geographical coordinates to a grid point where only one calibration point is in a geographic region according to an embodiment of the present subject matter. Blocks 1101 and 1102 are similar to blocks 101 and 102, respectively. At block 1113, if there is only one calibration point within the geographic region, then the geographical coordinates assigned to a grid point may result in the grid point being located within a predetermined radius of the one calibration point. Or, the geographical coordinates assigned to a grid point may be identical to the geographical coordinates of the calibration point.

Figure 12:
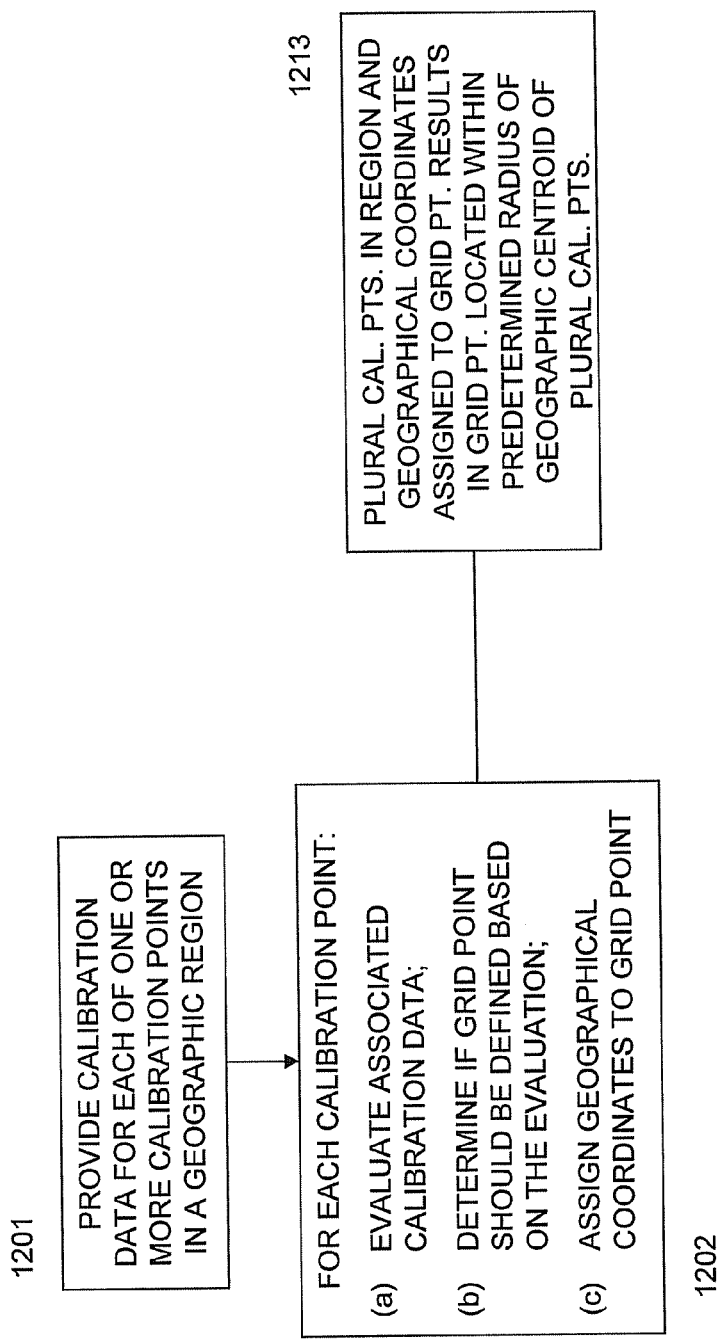
FIG. 12 is a flow chart for a method for assigning geographical coordinates including assigning geographical coordinates to a grid point where there are plural calibration points in a geographic region according to an embodiment of the present subject matter.

Moving now to FIG. 12, a flow chart is shown for a method for assigning geographical coordinates including assigning geographical coordinates to a grid point where there are plural calibration points in a geographic region according to an embodiment of the present subject matter. Blocks 1201 and 1202 are similar to blocks 101 and 102, respectively. At block 1213, where there are multiple calibration points in the geographic region, the geographical coordinates assigned to a grid point may result in the grid point being located within a predetermined radius of a centroid of a polygon formed by connecting the multiple calibration points.

Figure 13:
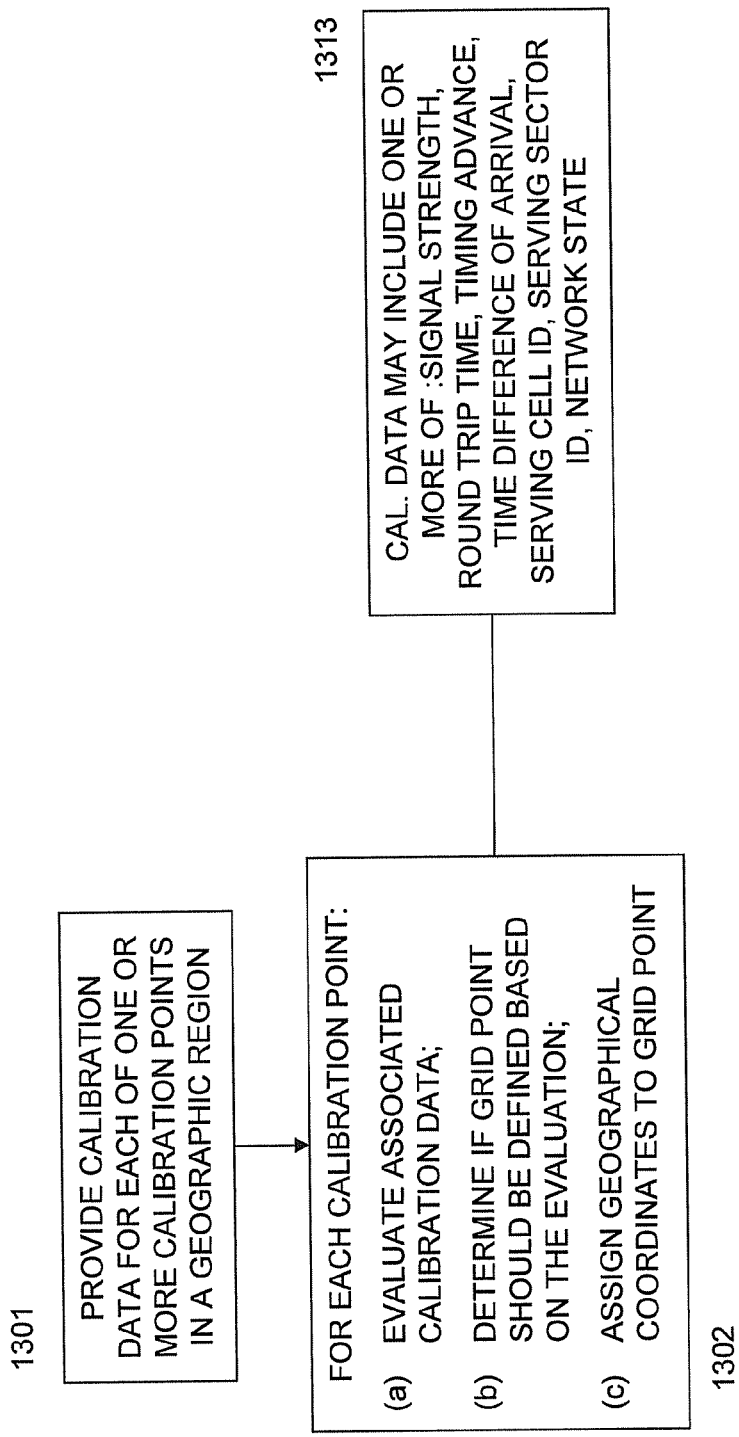
FIG. 13 is a flow chart for a method for assigning geographical coordinates including calibration data information according to an embodiment of the present subject matter.

FIG. 13 is a flow chart for a method for assigning geographical coordinates including calibration data information according to an embodiment of the present subject matter. Blocks 1301 and 1302 are similar to blocks 101 and 102, respectively. At block 1313, the calibration data may include one or more of the following: signal strength for a signal transmitted by a transmitter having a known location as received by a receiver at a calibration point; signal strength of a signal transmitted by a transmitter located at a calibration point as received by a receiver at a known location; round trip time for a signal traveling between a calibration point and a known location; timing advance of a signal received by a mobile device at a calibration point; time difference of arrival of plural signals at a calibration point with respect to a pair of known locations as measured by a receiver at a calibration point or at the known locations; the identification of a serving cell or serving sector of a mobile device located at a calibration point; a state of a wireless network serving a mobile device, and combinations thereof.

Figure 14:
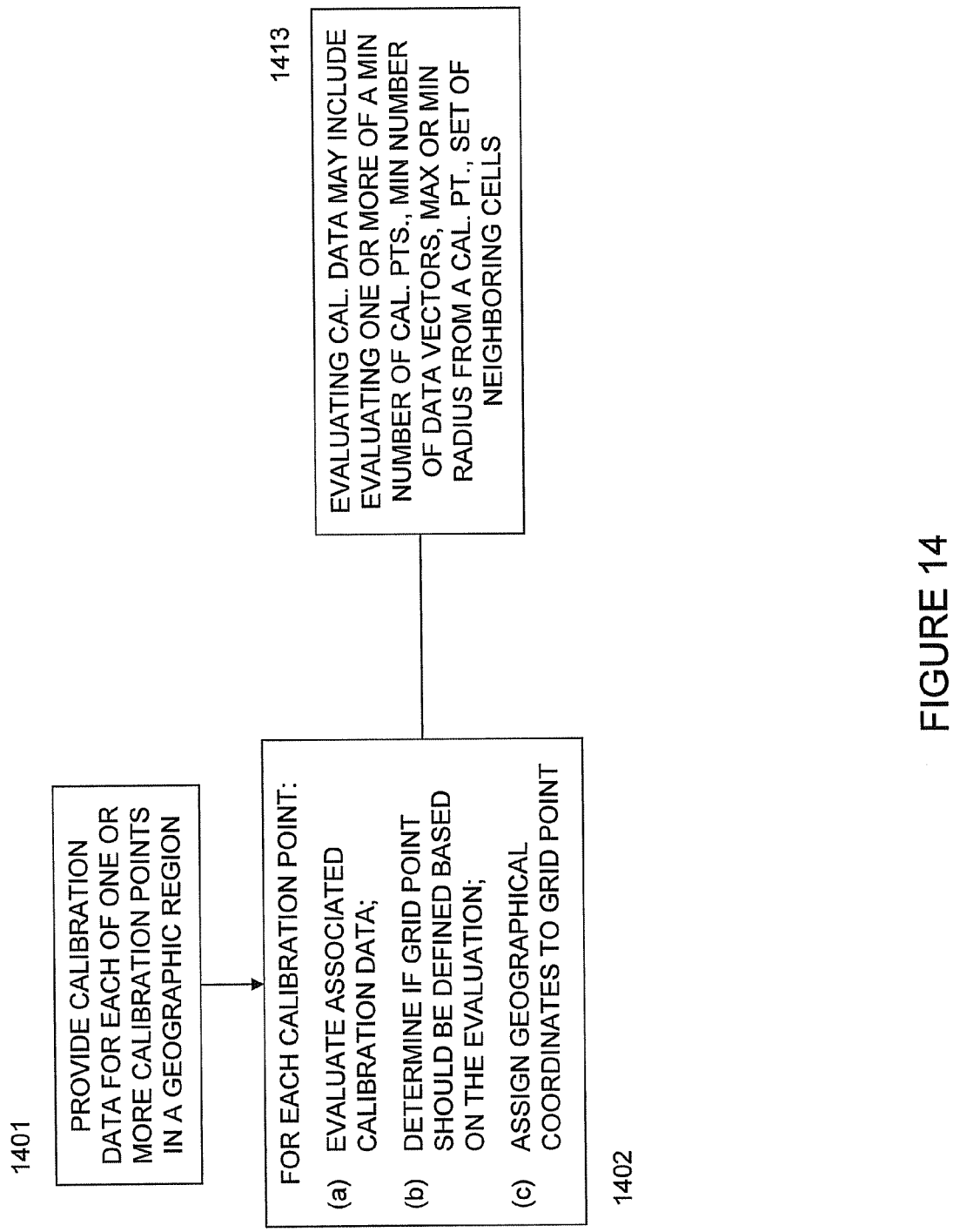
FIG. 14 is a flow chart for a method for assigning geographical coordinates including evaluating calibration data according to an embodiment of the present subject matter.

FIG. 14 is a flow chart for a method for assigning geographical coordinates including evaluating calibration data according to an embodiment of the present subject matter. Blocks 1401 and 1402 are similar to blocks 101 and 102, respectively. At block 1413, the evaluating of the calibration data associated with a calibration point may include an evaluation such as: a minimum number of unique neighboring calibration points as determined by calibration data of the neighboring calibration points; a minimum number of data vectors or network measurement reports; a predetermined maximum or minimum radius from a calibration point; a predetermined set of cells neighboring a cell serving a mobile device; and combinations thereof.

Figure 15:
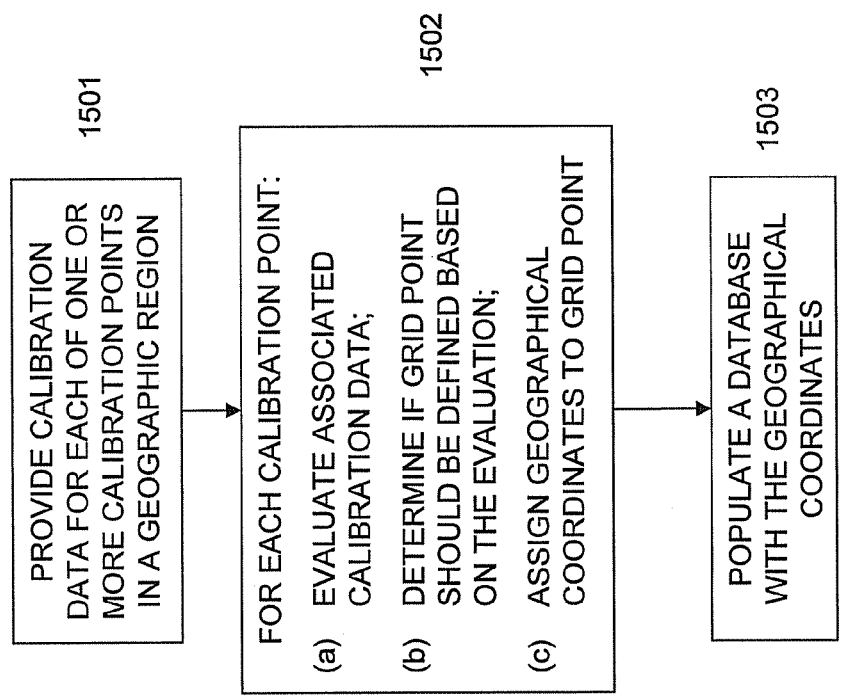
FIG. 15 is a flow chart for a method for assigning geographical coordinates including populating a database with the geographical coordinates according to an embodiment of the present subject matter.

FIG. 15 is a flow chart for a method for assigning geographical coordinates including populating a database with the geographical coordinates according to an embodiment of the present subject matter. Blocks 1501 and 1502 are similar to blocks 101 and 102, respectively. At block 1503, a database may be populated with the geographical coordinates assigned to the grid points.

Figure 16:
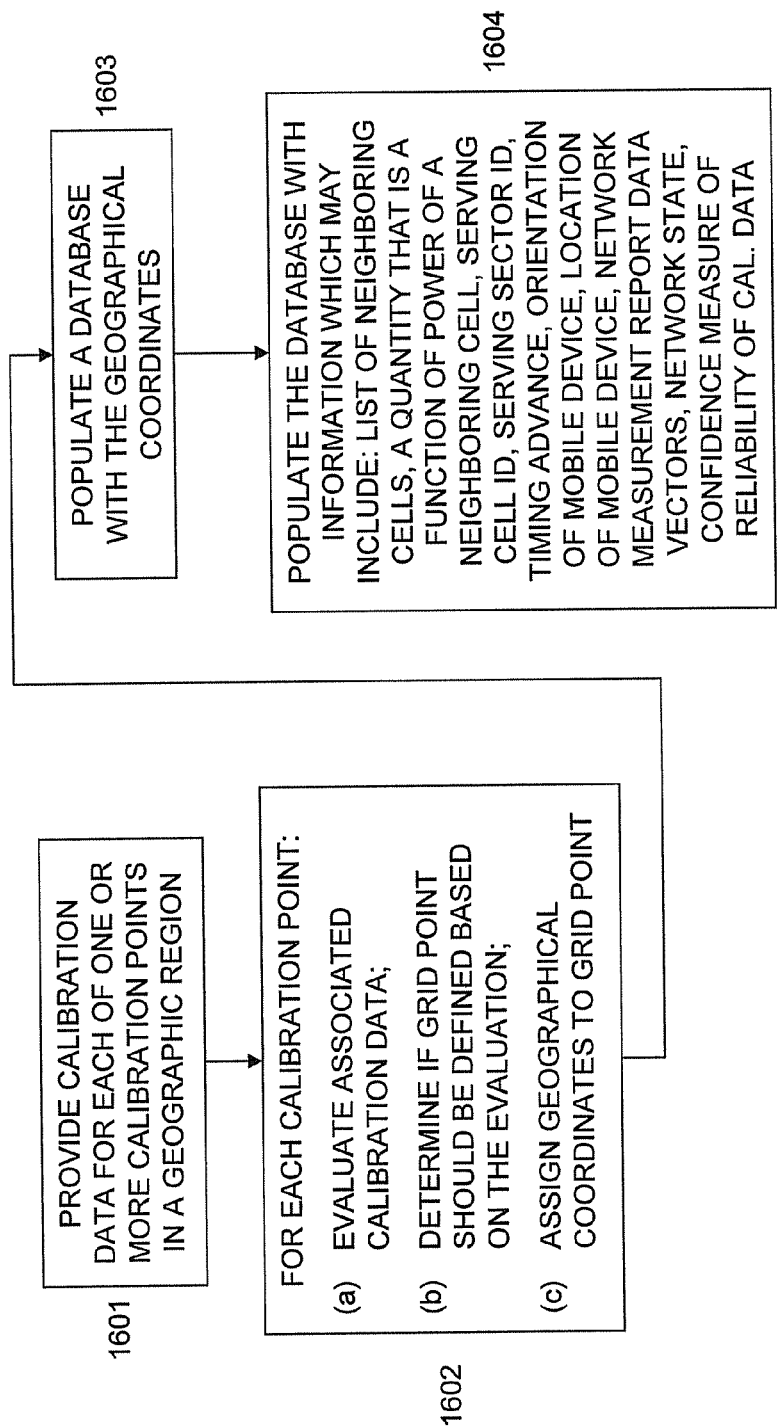
FIG. 16 is a flow chart for a method for assigning geographical coordinates including database information according to an embodiment of the present subject matter.

FIG. 16 is a flow chart for a method for assigning geographical coordinates including database information according to an embodiment of the present subject matter. Blocks 1601, 1602, and 1603 are similar to blocks 1501, 1502, and 1503, respectively. At block 1604, the database may be populated with information such as: a list of cells neighboring a cell serving a mobile device; a quantity that is a function of a power level of one or more cells neighboring a cell serving a mobile device; an identity of a cell or a sector serving a mobile device; a timing advance parameter; a geographical orientation of a mobile device; a location of a mobile device; network measurement report data vectors; a state of a network serving a mobile device; a confidence measure indicative of a reliability of the calibration data; and combinations thereof.

Figure 17:
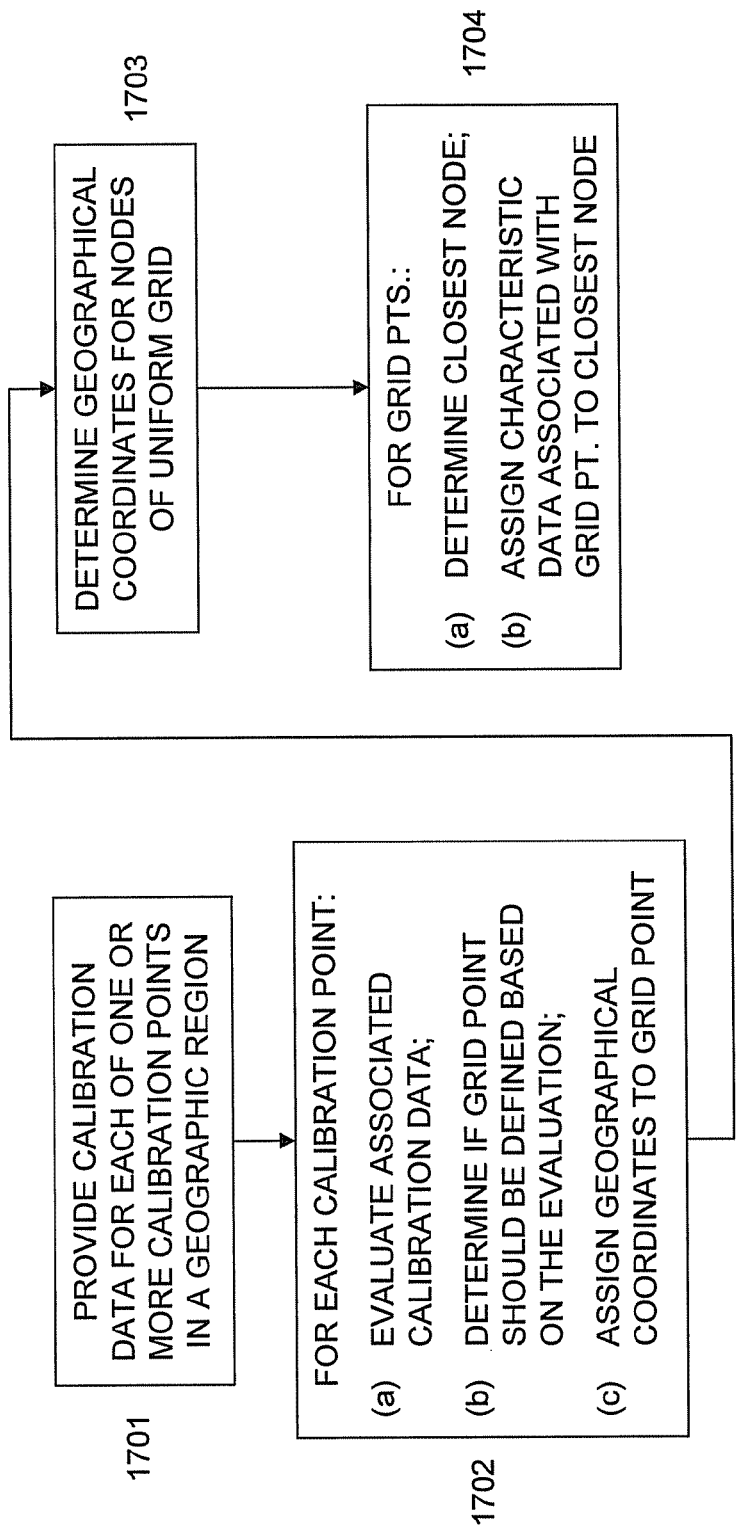
FIG. 17 is a flow chart for a method for assigning geographical coordinates including determining geographical coordinates for nodes of a uniform grid according to an embodiment of the present subject matter.

Directing attention now to FIG. 17, a flow chart is presented for a method for assigning geographical coordinates including determining geographical coordinates for nodes of a uniform grid according to an embodiment of the present subject matter. Blocks 1701 and 1702 are similar to blocks 101 and 102, respectively. At block 1703, geographical coordinates may be determined for the nodes of a uniform grid spanning the geographic region. At block 1704, for each of the grid points, a determination of the closest node of the uniform grid is made and the characteristic data associated with the grid point may be assigned to the closest node.

Figure 18:
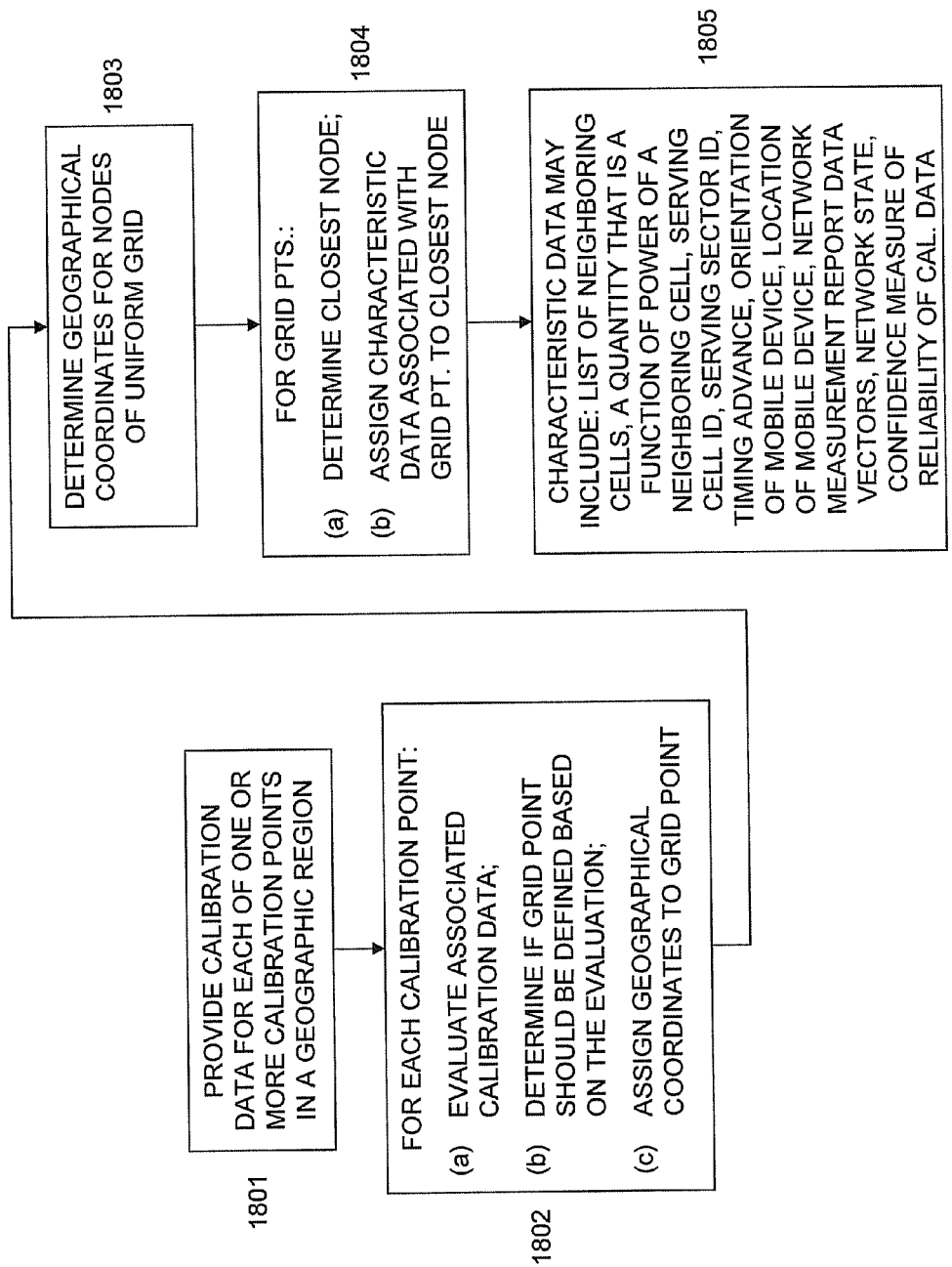
FIG. 18 is a flow chart for a method for assigning geographical coordinates including characteristic data to nodes of uniform grid according to an embodiment of the present subject matter.

Further, FIG. 18 is a flow chart for a method for assigning geographical coordinates including characteristic data to nodes of uniform grid according to an embodiment of the present subject matter. Here, blocks 1801, 1802, 1803, and 1804 are similar to blocks 1701, 1702, 1703, and 1704, respectively. At block 1805, the characteristic data may include a list of cells neighboring a cell serving a mobile device; a quantity that is a function of a power level of one or more cells neighboring a cell serving a mobile device; an identity of a cell or a sector serving a mobile device; a timing advance parameter; a geographical orientation of a mobile device; a location of a mobile device; network measurement report data vectors; a state of a network serving a mobile device; a confidence measure indicative of a reliability of the calibration data; and combinations thereof.

Figure 19:
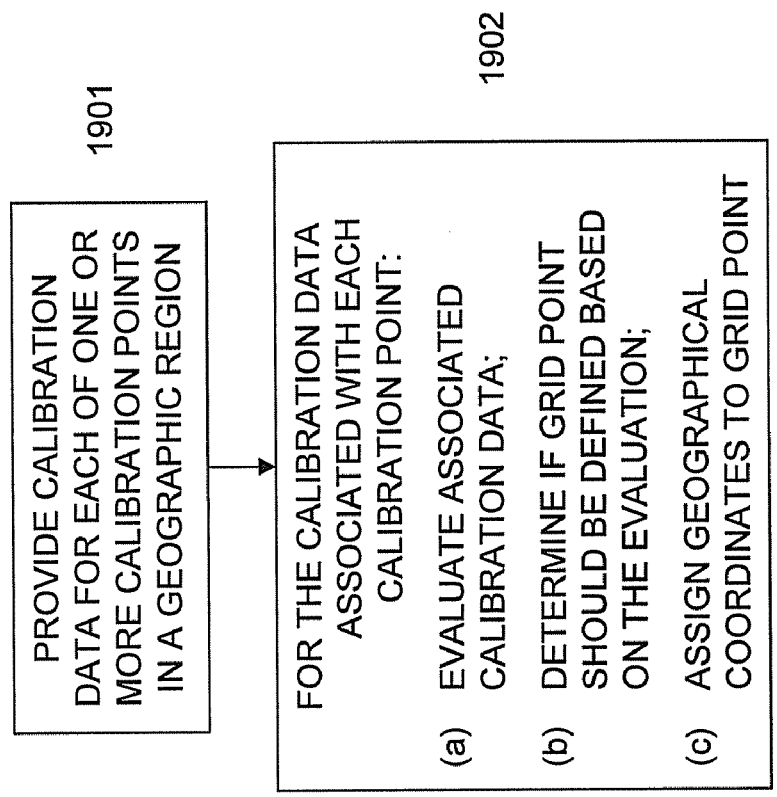
FIG. 19 is a flow chart for a method for assigning geographical coordinates for calibration data for each of one or more calibration points in a geographic region according to an embodiment of the present subject matter.

With reference to FIG. 19, a flow chart is illustrated for a method for assigning geographical coordinates for calibration data for each of one or more calibration points in a geographic region according to an embodiment of the present subject matter. At block 1901, calibration data may be provided for each of one or more calibration points in a geographic region. At block 1902, for the calibration data for each of the calibration points in the geographic region, the calibration data is evaluated and a determination is made as to whether a grid point should be defined based on the evaluation. If it is determined that a grid point is to be defined, geographical coordinates are assigned to the grid point so that the grid point may be useful in estimating the location of a mobile device.

Figure 20:
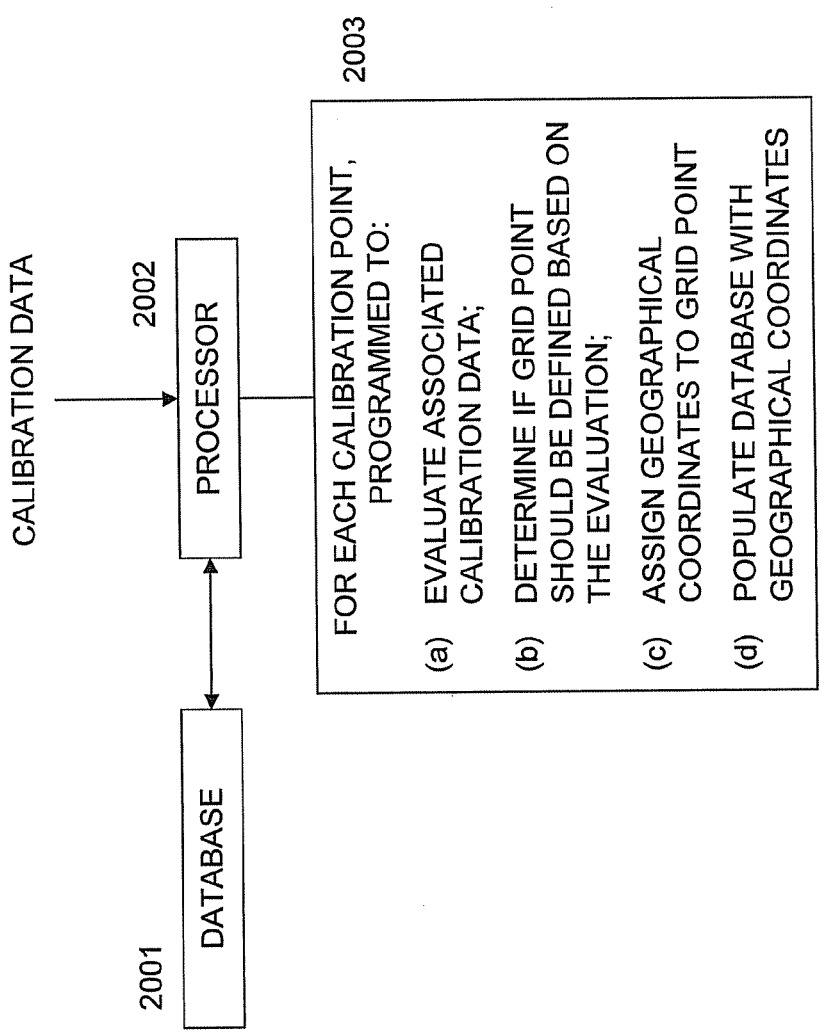
FIG. 20 is a block diagram for a system for assigning geographical coordinates according to an embodiment of the present subject matter.

With attention now directed to FIG. 20, a block diagram is presented that represents a system for assigning geographical coordinates according to an embodiment of the present subject matter. A database 2001 is operatively connected to a processor 2002. The processor 2002 is capable of receiving calibration data for each of one or more calibration points in a geographic region. The processor 2002 may be programmed, as shown in block 2003, to evaluate the calibration data associated with the calibration points, determine if at least one grid point should be defined based on the evaluation, assign geographical coordinates to the one or more grid points, and populate the database 2001 with the geographical coordinates.

Figure 21:
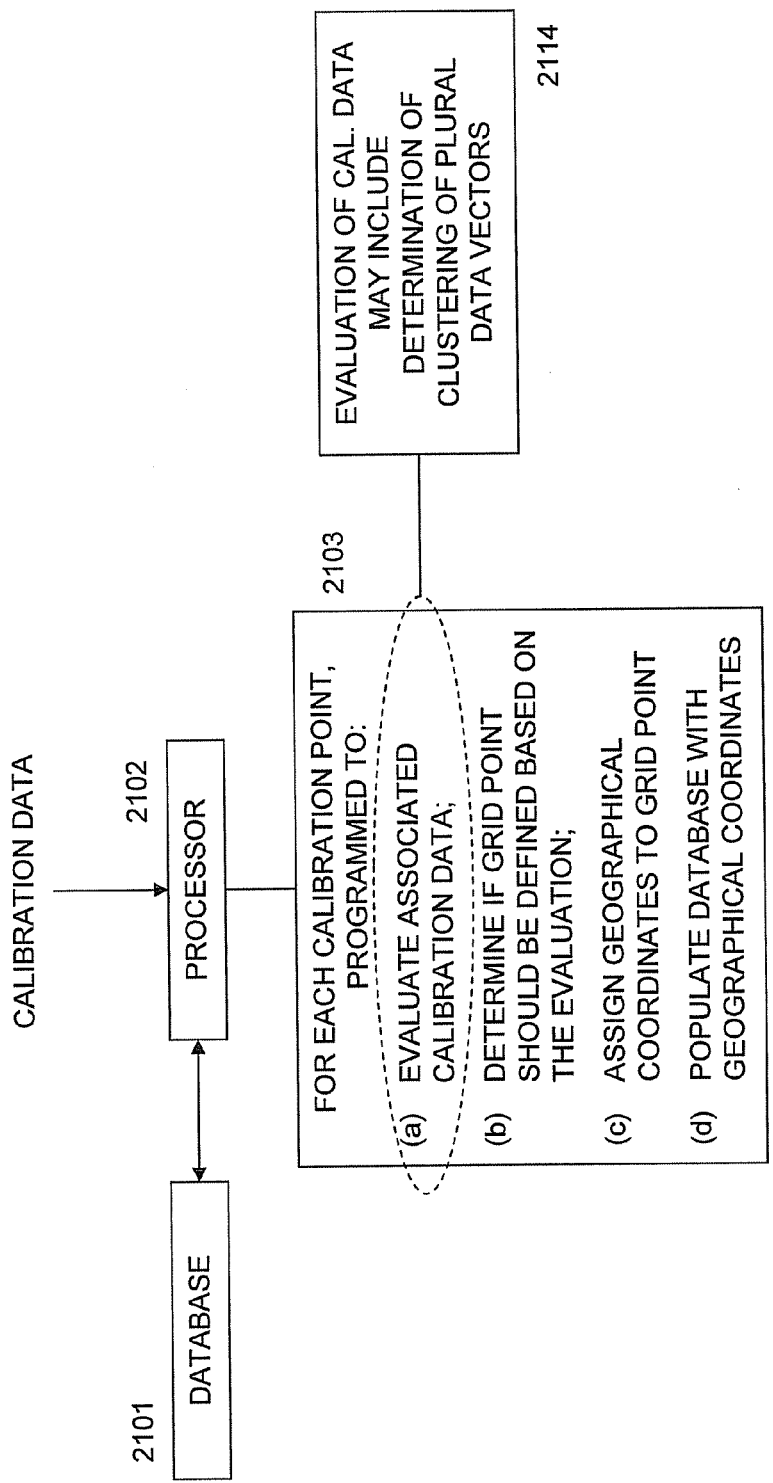
FIG. 21 is a block diagram for a system for assigning geographical coordinates including a determination of clustering of plural data vectors according to an embodiment of the present subject matter.

FIG. 21 is a block diagram for a system for assigning geographical coordinates including a determination of clustering of plural data vectors according to an embodiment of the present subject matter. The database 2101, the processor 2102, and block 2103 are similar to the database 2001, the processor 2002, and block 2003, as described above, respectfully. At block 2114, for each of select ones of the calibration points, the calibration data may include multiple data vectors and the evaluating of the calibration data may include a determination of clustering of the multiple data vectors.

Figure 22:
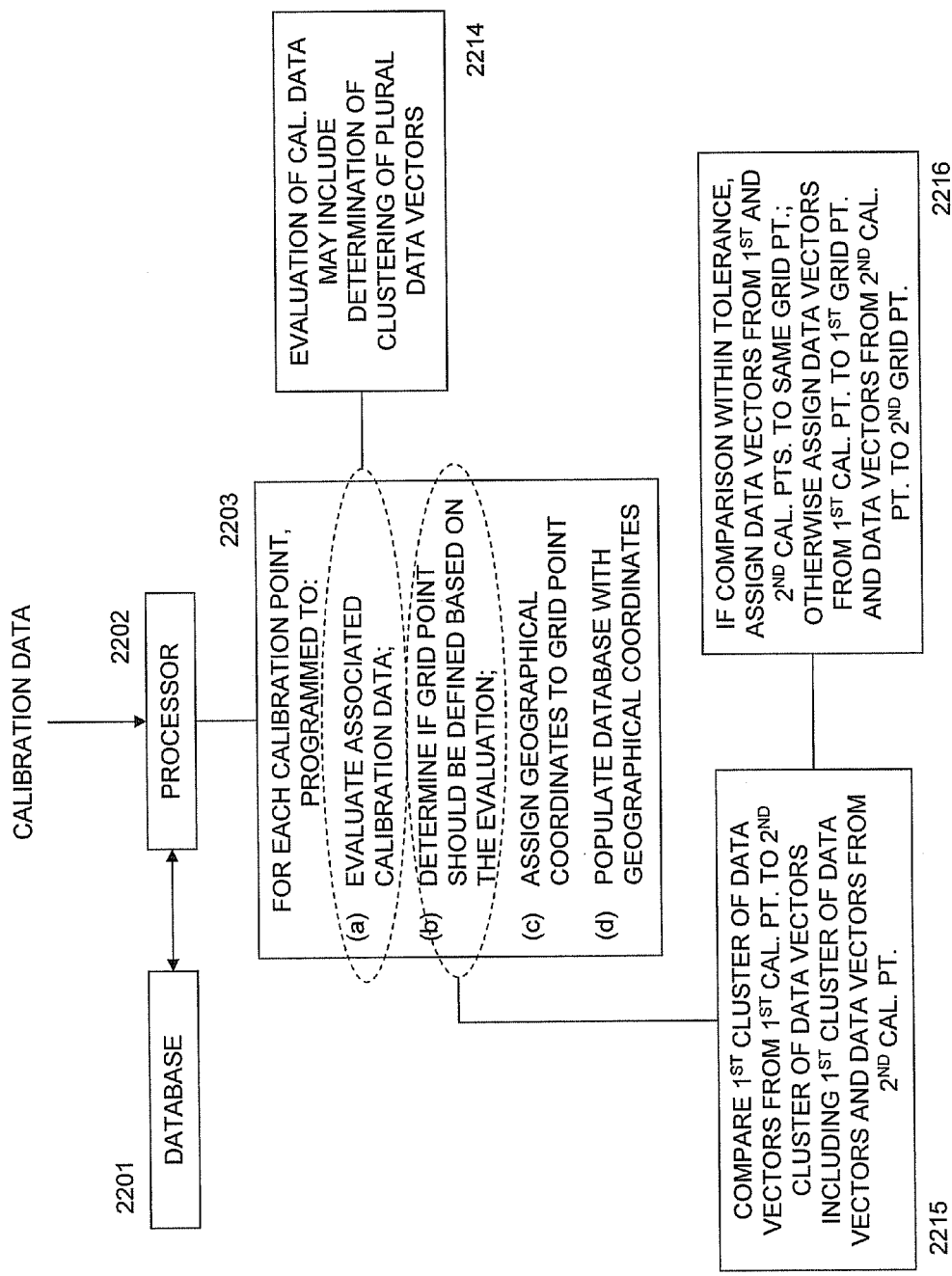
FIG. 22 is a block diagram for a system for assigning geographical coordinates including comparing clusters of data vectors from different calibration points according to an embodiment of the present subject matter.

FIG. 22 is a block diagram for a system for assigning geographical coordinates including comparing clusters of data vectors from different calibration points according to an embodiment of the present subject matter. The database 2201, the processor 2202, block 2203, and block 2214 are similar to the database 2101, the processor 2102, block 2103, and block 2114, as described above, respectfully. At block 2215, the determination if at least one grid point should be defined based on the evaluation may include comparing a first cluster of data vectors from a first one of the select calibration points to a second cluster of data vectors, where the second cluster of data vectors may include the first cluster of data vectors and data vectors from a second one of the select calibration points. At block 2216, if the result of the comparison is within a predetermined tolerance, then the data vectors from the first and second calibration points may be assigned to the same grid point; otherwise, the data vectors from the first calibration point may be assigned to a first grid point and the data vectors from the second calibration point may be assigned to a second grid point.

Figure 23:
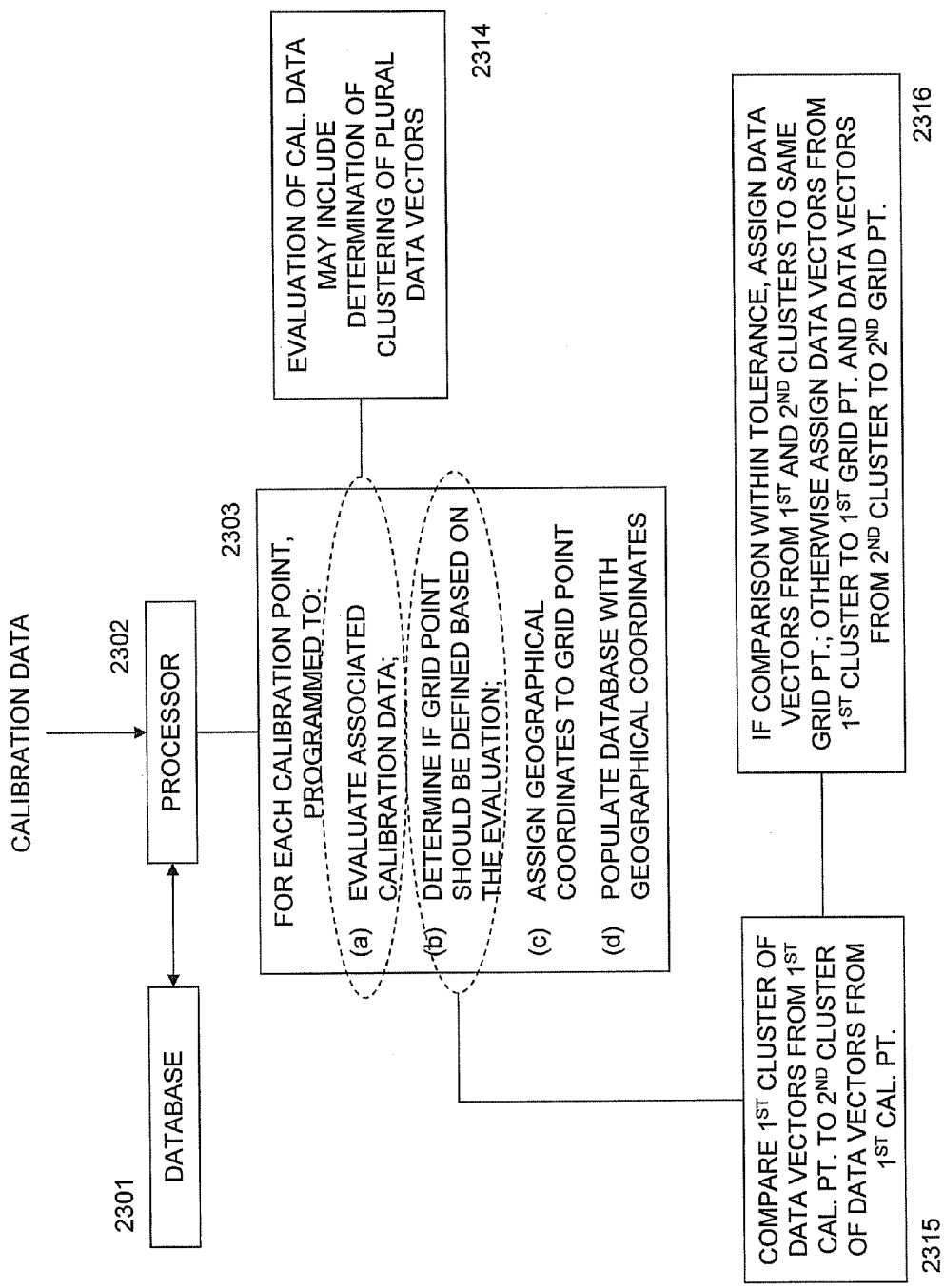
FIG. 23 is a block diagram for a system for assigning geographical coordinates including comparing clusters of data vectors from the same calibration point according to an embodiment of the present subject matter.

FIG. 23 is a block diagram for a system for assigning geographical coordinates including comparing clusters of data vectors from the same calibration point according to an embodiment of the present subject matter. The database 2301, the processor 2302, block 2303, and block 2314 are similar to the database 2101, the processor 2102, block 2103, and block 2114, as described above, respectfully. At block 2315, the determination if at least one grid point should be defined based on the evaluation may include comparing a first cluster of data vectors from a first one of the select calibration points to a second cluster of data vectors from the first one of the select calibration points. At block 2316, if the result of the comparison is within a predetermined tolerance, then the data vectors from the first and second calibration points may be assigned to the same grid point; otherwise, the data vectors from the first cluster may be assigned to a first grid point and the data vectors from the second cluster may be assigned to a second grid point.

Figure 24:
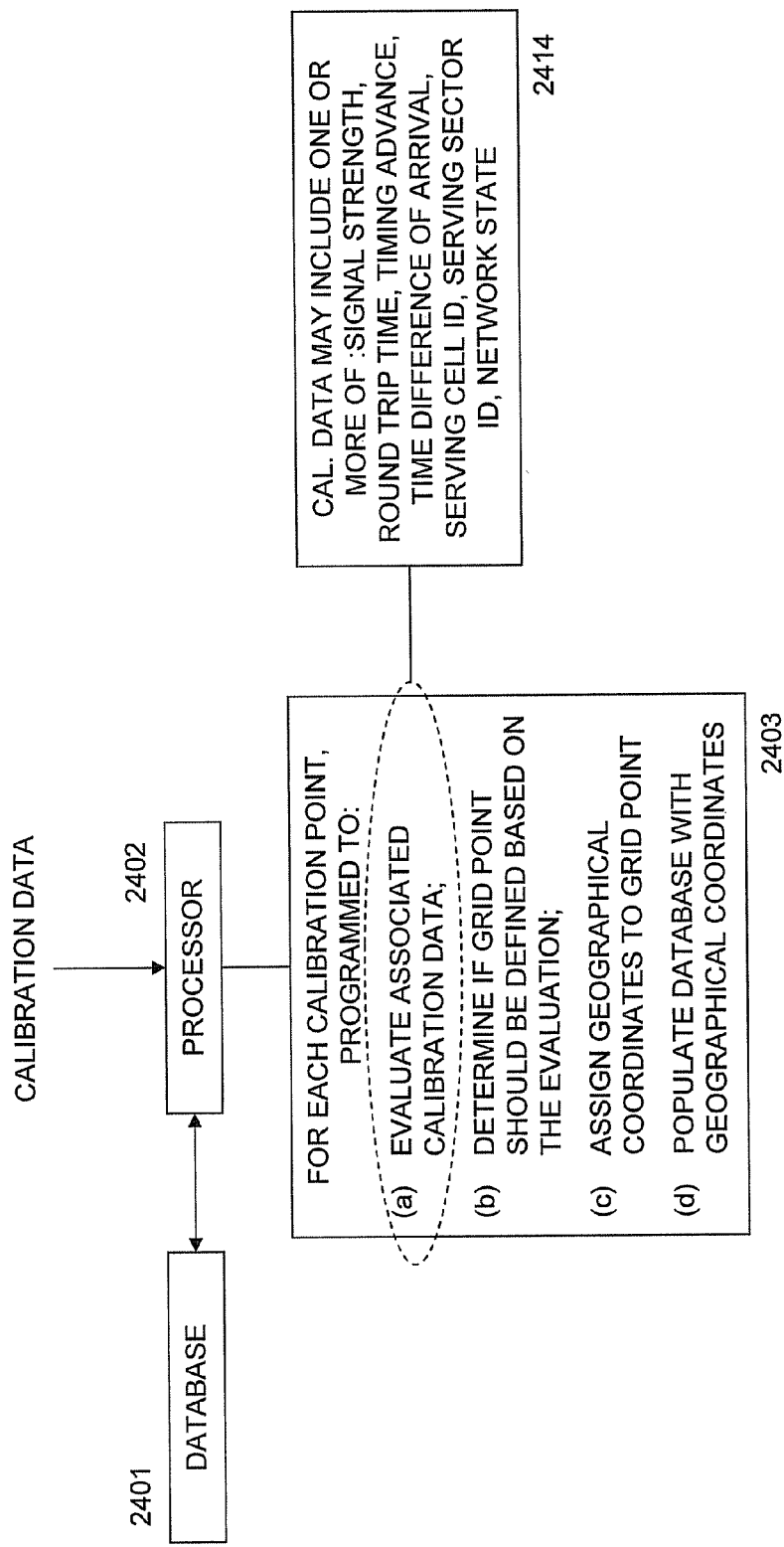
FIG. 24 is a block diagram for a system for assigning geographical coordinates including calibration data according to an embodiment of the present subject matter.

Looking now at FIG. 24, a block diagram is presented representing a system for assigning geographical coordinates including calibration data according to an embodiment of the present subject matter. The database 2401, the processor 2402, and block 2403 are similar to the database 2001, the processor 2002, and block 2003, as described above, respectfully. At block 2414, the calibration data may include: signal strength for a signal transmitted by a transmitter having a known location as received by a receiver at a calibration point; signal strength of a signal transmitted by a transmitter located at a calibration point as received by a receiver at a known location; round trip time for a signal traveling between a calibration point and a known location; timing advance of a signal received by a mobile device at a calibration point; time difference of arrival of multiple signals at a calibration point with respect to a pair of known locations as measured by a receiver at a calibration point or at the known locations; the identification of a serving cell or serving sector of a mobile device located at a calibration point; a state of a wireless network serving a mobile device, and combinations thereof.

Figure 25:
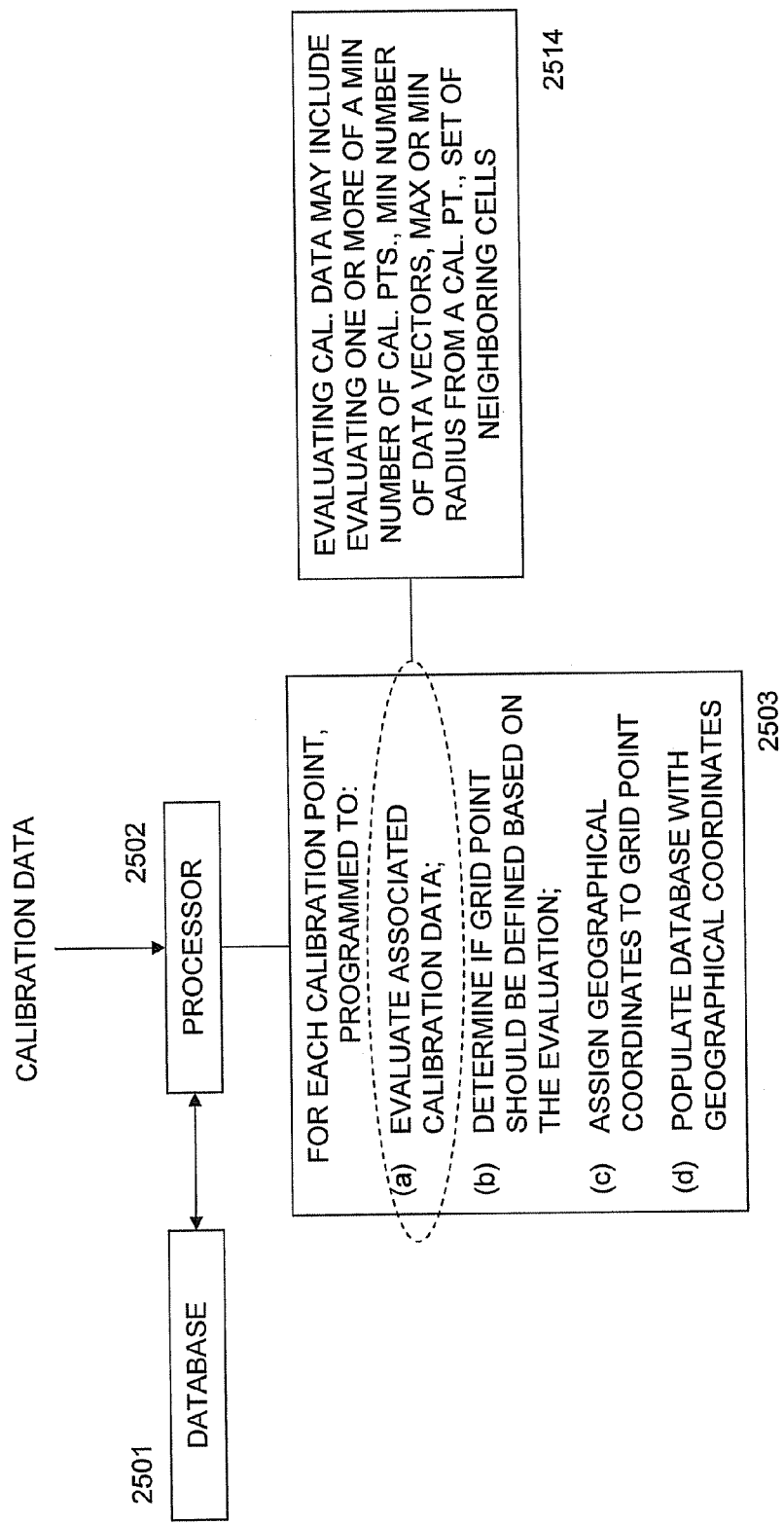
FIG. 25 is a block diagram for a system for assigning geographical coordinates including evaluating calibration data according to an embodiment of the present subject matter.

FIG. 25 is a block diagram for a system for assigning geographical coordinates including evaluating calibration data according to an embodiment of the present subject matter. The database 2501, the processor 2502, and block 2503 are similar to the database 2001, the processor 2002, and block 2003, as described above, respectfully. At block 2514, the evaluation of the associated calibration data may include an evaluation such as: a minimum number of unique neighboring calibration points as determined by calibration data of the neighboring calibration points; a minimum number of data vectors or network measurement reports; a predetermined maximum or minimum radius from a calibration point; a predetermined set of cells neighboring a cell serving a mobile device; and combinations thereof.

Figure 26:
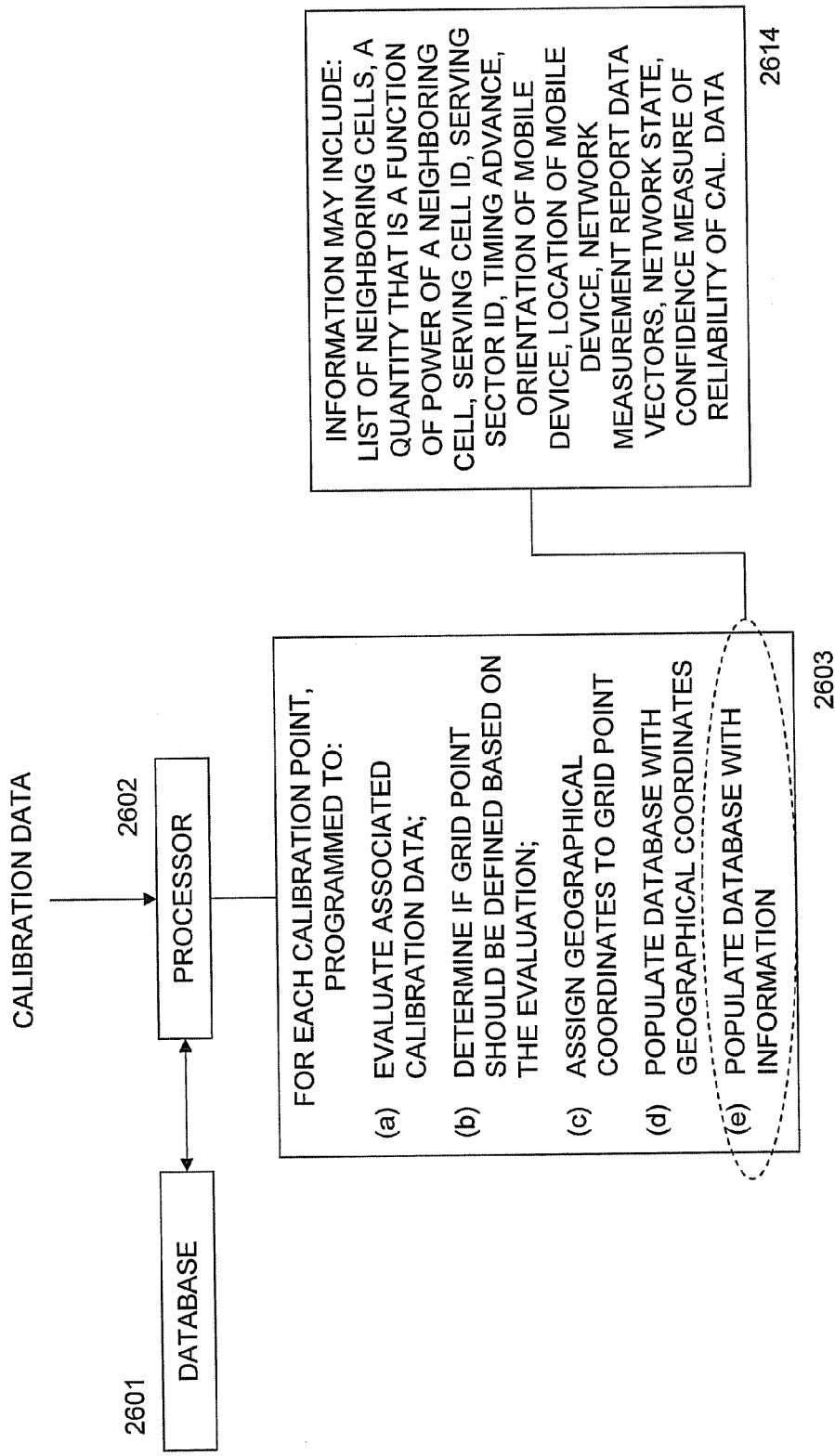
FIG. 26 is a block diagram for a system for assigning geographical coordinates including information for populating a database according to an embodiment of the present subject matter.

FIG. 26 is a block diagram for a system for assigning geographical coordinates including information for populating a database according to an embodiment of the present subject matter. The database 2601 and the processor 2602 are similar to the database 2001 and the processor 2002, as described above, respectfully. At block 2603, the processor 2602 may be programmed to evaluate the calibration data associated with the calibration points, determine if at least one grid point should be defined based on the evaluation, assign geographical coordinates to the one or more grid points, populate the database 2601 with the geographical coordinates, and populate the database 2601 with information which may include: a list of cells neighboring a cell serving a mobile device; a quantity that is a function of a power level of one or more cells neighboring a cell serving a mobile device; an identity of a cell or a sector serving a mobile device; a timing advance parameter; a geographical orientation of a mobile device; a location of a mobile device; network measurement report data vectors; a state of a network serving a mobile device; a confidence measure indicative of a reliability of the calibration data; and combinations thereof.

Figure 27:
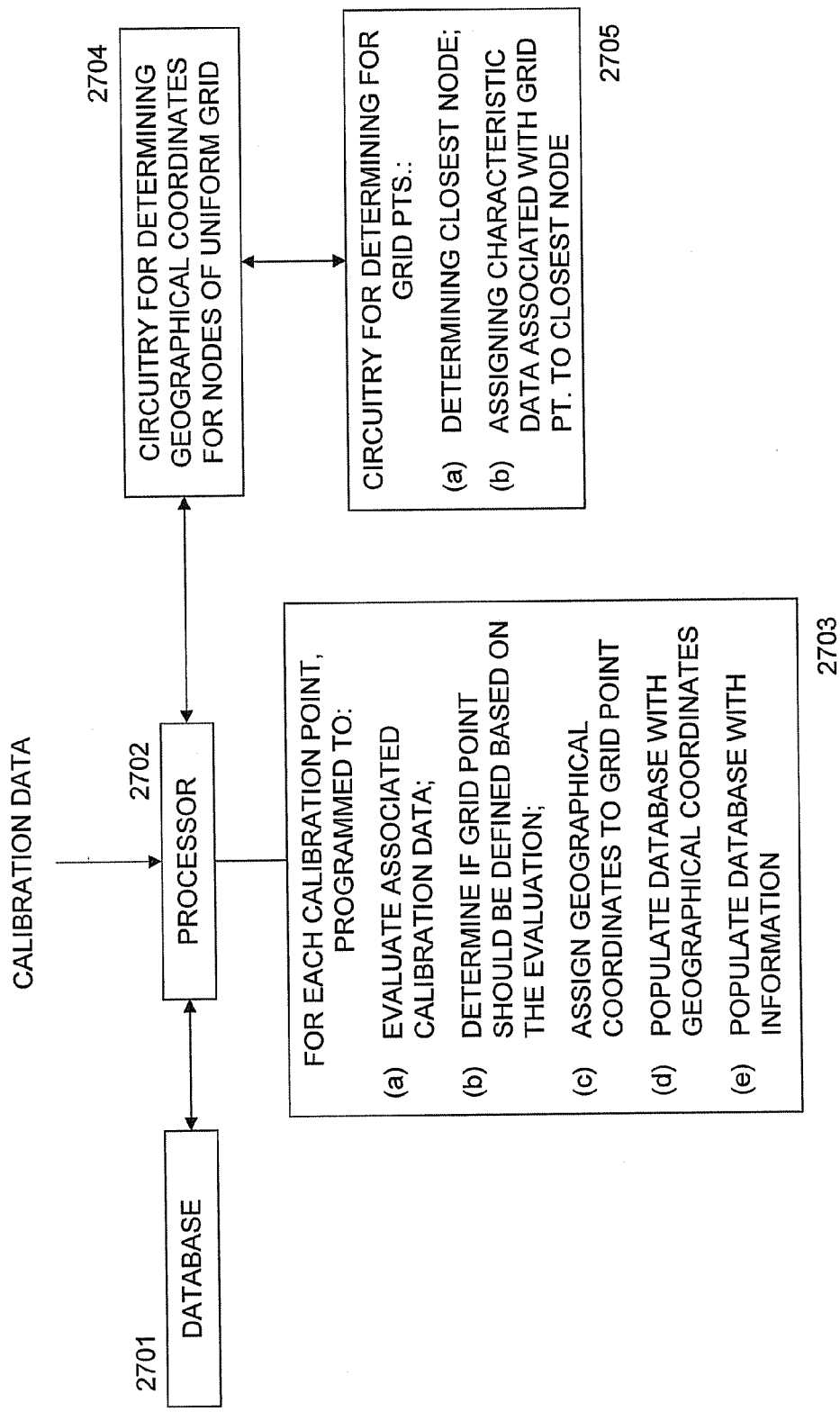
FIG. 27 is a block diagram for a system for assigning geographical coordinates including circuitry for determining geographical coordinates for nodes of a uniform grid according to an embodiment of the present subject matter.

FIG. 27 is a block diagram for a system for assigning geographical coordinates including circuitry for determining geographical coordinates for nodes of a uniform grid according to an embodiment of the present subject matter. The database 2701, the processor 2702, and block 2703 are similar to the database 2601, the processor 2602, and block 2603, as described above, respectfully. The system may further comprise circuitry 2704 for determining geographical coordinates for each of a plurality of nodes of a uniform grid spanning the geographic region, and circuitry 2705 for determining, for each of the one or more grid points, a closest node from the plurality of nodes of the uniform grid and assigning characteristic data associated with each of the grid point to its closest node.

Figure 28:
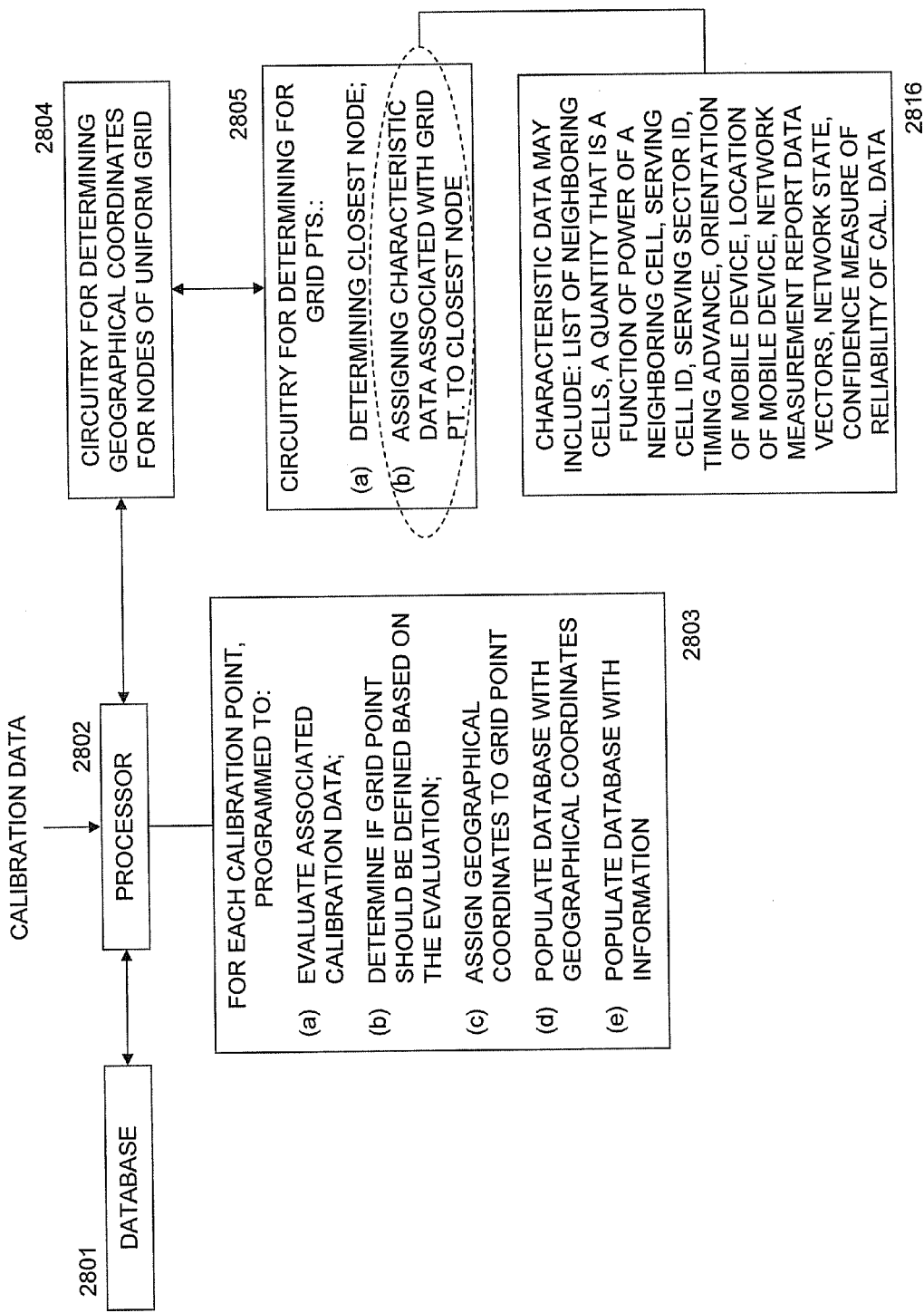
FIG. 28 is a block diagram for a system for assigning geographical coordinates including characteristic data according to an embodiment of the present subject matter.

FIG. 28 is a block diagram for a system for assigning geographical coordinates including characteristic data according to an embodiment of the present subject matter. The database 2801, the processor 2802, block 2803, circuitry 2804, and circuitry 2805 are similar to the database 2701, the processor 2702, block 2703, circuitry 2704, and circuitry 2705, as described above, respectfully. At block 2816, the characteristic data may include: a list of cells neighboring a cell serving a mobile device; a quantity that is a function of a power level of one or more cells neighboring a cell serving a mobile device; an identity of a cell or a sector serving a mobile device; a timing advance parameter; a geographical orientation of a mobile device; a location of a mobile device; network measurement report data vectors; a state of a network serving a mobile device; a confidence measure indicative of a reliability of the calibration data; and combinations thereof.

In one aspect of embodiments of the present subject matter, it may be desirable to provide an estimate of an expected accuracy when considering whether or not to deploy a mobile geo-location system in a particular market. Therefore, exemplary embodiments may employ a radio frequency ("RF") planning model to predict the accuracy of a signal strength pattern matching location system.

An exemplary RF software planning tool or model for location accuracy estimation may utilize market cell site configuration information such as, but not limited to, cell site location, number of sectors, sector azimuth, sector antenna beam-width, antenna heights, antenna down-tilt, downlink control channel transmit power, stored terrain map information, and any combination thereof. As a function of this configuration information, an exemplary RF planning model may estimate neighbor cell site signal reception as a function of mobile location in the market region. Various other parameters that depend upon the configuration information and a particular mobile location may also be estimated and such an example should not limit the scope of the claims appended herewith.

For example, an approximate statistical accuracy of a signal strength pattern matching system as a function of NC site "hearability" may be determined through prior system accuracy testing. From NC site signal hearability predictions and known location system accuracy as a function of hearability, the expected accuracy of a pattern matching location system may be appropriately modeled throughout a deployment region. An exemplary accuracy prediction map may provide information for geo-location system deployment. Of course, expected values of various other parameters may also be estimated at any given location within the region. Expected characteristics of one or more NMRs may then be derived that are associated with a mobile device at the given location. Through a determination of these artificial NMRs over one or more calibration points defined over the region, non-uniform grid points (NUGs) or uniform grid points (UGs) may be constructed as described above.

Further, parameters provided from any portion of a respective geo-location system may be utilized to determine a location of a mobile device in conjunction with any actual NMRs received from the mobile device with respect to an unknown location and the calibration points against which these NMRs are compared or evaluated. Methods and systems by which calibration or grid points may be utilized to determine a location estimate of a mobile device are described in U.S. application Ser. No. 12/019,509, entitled "System and Method for Generating a Location Using Non-Uniform Grid Points," U.S. application Ser. No. 12/023,841, entitled "System and Method for Generating a Location Using a Method of Intersections," U.S. application Ser. No. 12/026,480, entitled "System and Method for Generating a Location Using Uniform and Non-Uniform Grid Points," and U.S. application Ser. No. 12/014,018, entitled "System and Method for Optimizing Location Estimate for a Mobile Unit," the entirety of each are incorporated herein by reference. Provided a known location and the results of the simulation (which may generate an estimated location), a location error estimate (i.e., location accuracy) for that location may then be estimated.

The location accuracy may therefore be determined for every grid point in the region. Of course, various measures of location accuracy may also be generated such as an $n^{th}$ percentile of expected error or other measures of expected error. In a further embodiment of the present subject matter, an expected accuracy may also be determined through an examination of the function describing the respective data vector of NMR parameters. For example, an expected accuracy may be related to the rate at which the correlation between adjacent NMR data vectors (e.g., NMR data vectors examined from a first grid point to other grid points in the geographical vicinity of the first grid point) decay over distance. Assuming the correlation is a scalar function, the gradient thereof may be obtained in a two dimensional space which provides an indication as to the expected error (e.g., the larger the magnitude of the gradient, the more separable the NMRs are with distance and the smaller the error). For example, as the NMR data vectors, or more generally the characteristic functions of the grid points (NUGs or UGs), may vary greatly from one particular grid point to adjacent grid points, the expected accuracy may likely be higher in the immediate neighborhood of the first grid point. This result follows since the grid points are more distinguishable, via the variability of the NMRs, one from another, in the vicinity of the first grid point. A relationship of the gradient to the location error may be determined empirically or through calculation on calibration data or calculation on NUG/UG characteristics. An empirical result may, for example, be derived from knowledge of actual observed location errors and actual computed gradients for a set of grid points in some geographical region. Such observations may allow the association of certain values of the gradient with certain values of location error. Direct methods of calculation may, for example, examine the gradient functions so obtained at a set of grid points (NUGs or UGs) to calculate the statistics of the location error. A further embodiment may also utilize the gradient functions in conjunction with a model (e.g., noise, multipath, etc.) to calculate the statistics of the location error.

Figure 29:
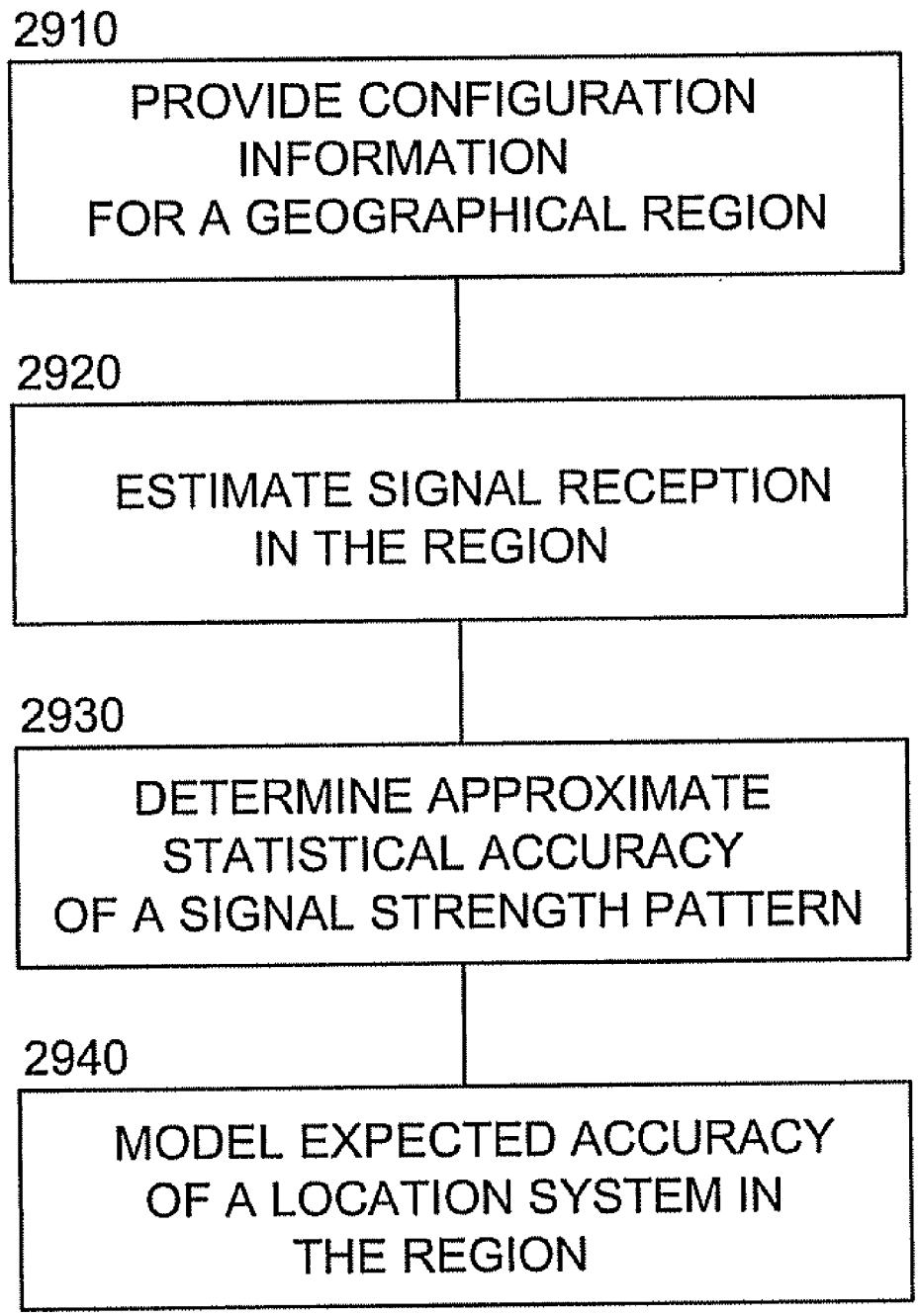
FIGS. 29-30 are flow charts for methods of predicting an expected accuracy of a location system in a geographic region according to embodiments of the present subject matter.

FIG. 29 is a flow chart for a method of predicting an expected accuracy of a location system in a geographic region according to an embodiment of the present subject matter. With reference to FIG. 29, at block 2910 configuration information may be provided for the geographic region and at block 2920, signal reception may be estimated in the region as a function of mobile device location in the region. Exemplary configuration information may be, but is not limited to, cell site locations, number of sectors, sector azimuths, sector antenna beam-widths, antenna heights, antenna down-tilts, downlink control channel transmit powers, a state of a network serving a mobile device, a list of cells neighboring a cell serving a mobile device, a quantity that is a function of a power level of one or more cells neighboring a cell serving a mobile device, an identity of a cell serving a mobile device, an identity of a sector serving said a mobile device, terrain map information for RF signal path loss modeling, and combinations thereof. An approximate statistical accuracy of a signal strength pattern as a function of the estimated signal reception in the region may be determined at block 2930. Then at block 2940, an expected accuracy of the location system in the region may be modeled as a function of the configuration information and the determined approximate statistical accuracy. Of course, the geographic region may be, in one embodiment, a deployment region.

Figure 30:
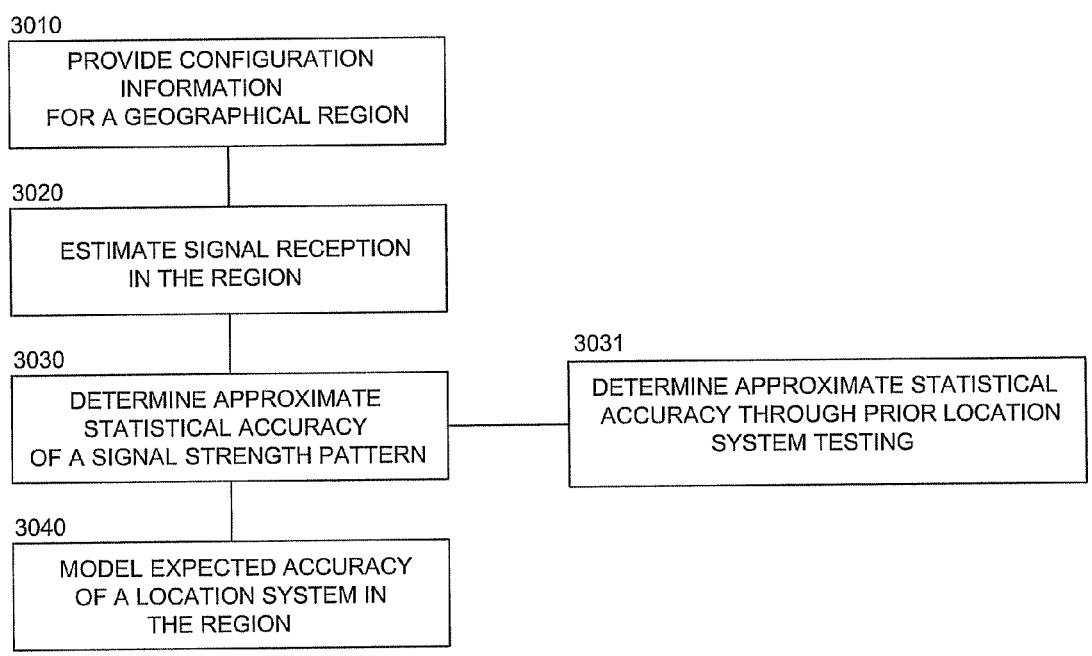

FIG. 30 is a flow chart for a method of predicting an expected accuracy of a location system in a geographic region according to another embodiment of the present subject matter. Here, blocks 3010, 3020, 3030 and 3040 are similar to blocks 2910, 2920, 2930, and 2940, respectively. With reference to FIG. 30, at block 3031, in one embodiment of the present subject matter an approximate statistical accuracy may be determined through prior location system accuracy testing. By way of a non-limiting example, a relationship of the gradient to the location error may be determined empirically or through calculation on calibration data or calculation on NUG/UG characteristics. An empirical result may, for example, be derived from knowledge of actual observed location errors and actual computed gradients for a set of grid points in some geographical region. Such observations may allow the association of certain values of the gradient with certain values of location error. Direct methods of calculation may, for example, examine the gradient functions so obtained at a set of grid points (NUGs or UGs) to calculate the statistics of the location error. A further embodiment may also utilize the gradient functions in conjunction with a model (e.g., noise, multipath, etc.) to calculate the statistics of the location error.

FIG. 31 is a flow chart for a method of assigning geographical coordinates to a calibration point located in a geographic region for the location of a mobile device according to one embodiment of the present subject matter. With reference to FIG. 31, at block 3110, configuration information may be provided for a geographic region and at block 3120, one or more expected characterizing parameters of a NMR associated with a hypothetical mobile device at each of one or more grid points in the geographic region may be estimated. Exemplary configuration information may be, but is not limited to, cell site locations, number of sectors, sector azimuths, sector antenna beam-widths, antenna heights, antenna down-tilts, downlink control channel transmit powers, a state of a network serving the mobile device, a list of cells neighboring a cell serving the mobile device, a quantity that is a function of a power level of one or more cells neighboring a cell serving the mobile device, an identity of a cell serving the mobile device, an identity of a sector serving the mobile device, terrain map information for RF signal path loss modeling, and combinations thereof. At block 3130, for each of the calibration points, the expected characterizing parameters may be evaluated, a determination made whether at least one grid point should be defined based on the evaluation, and geographical coordinates assigned to the at least one grid point. Any one or plural grid points may be located on a predetermined fixed uniform grid defined over the geographic region and any one or plural grid points may be randomly located within the geographic region. Further, exemplary characterizing parameters may be, but are not limited to, signal strength, round trip time, timing advance, time difference of arrival, the identification of a serving cell or serving sector of a mobile device in the geographic region, a state of a wireless network serving the mobile device, and combinations thereof.

Figure 32:
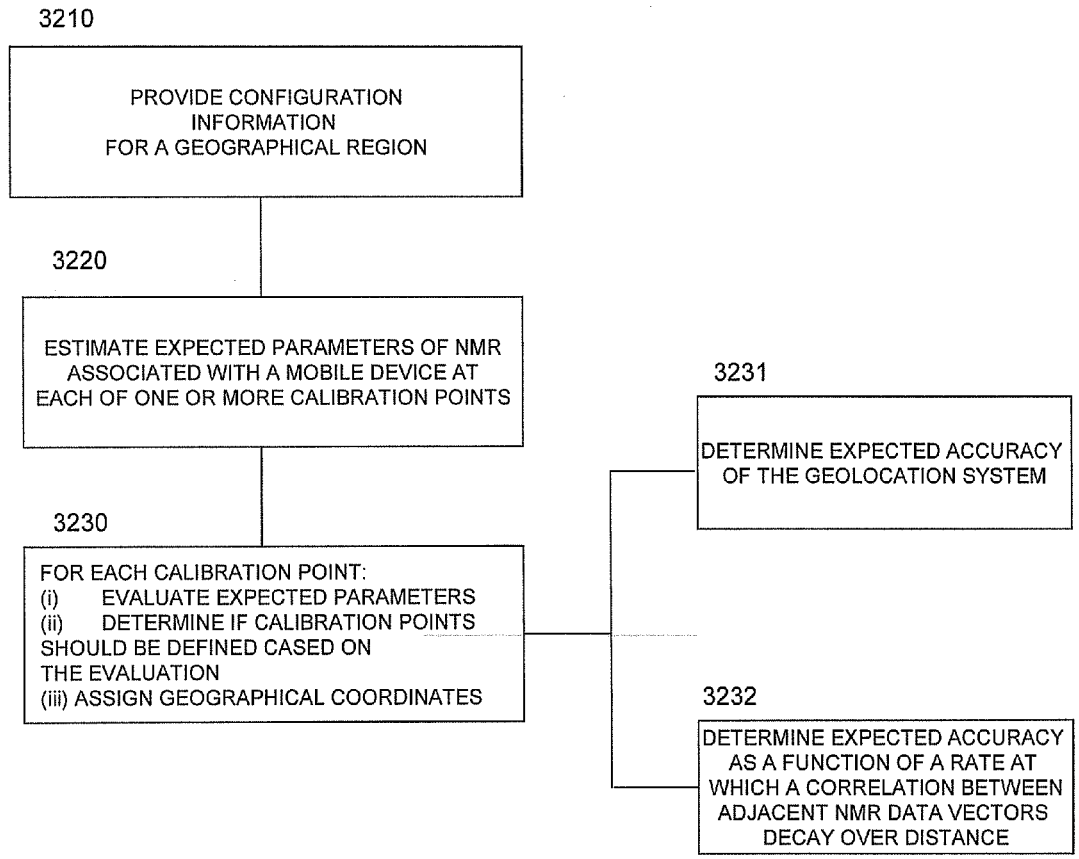

FIG. 32 is a flow chart for a method of assigning geographical coordinates to a calibration point located in a geographic region for the location of a mobile device according to another embodiment of the present subject matter. Here, blocks 3210, 3220 and 3230 are similar to blocks 3110, 3120 and 3130, respectively. With reference to FIG. 32, at block 3231, an expected accuracy of a geolocation system may be determined in the geographic region as a function of the configuration information and an approximate statistical accuracy. For example, a relationship of the gradient to the location error may be determined empirically or through calculation on calibration data or calculation on NUG/UG characteristics. An empirical result may, for example, be derived from knowledge of actual observed location errors and actual computed gradients for a set of grid points in some geographical region. Such observations may allow the association of certain values of the gradient with certain values of location error. Direct methods of calculation may, for example, examine the gradient functions so obtained at a set of grid points (NUGs or UGs) to calculate the statistics of the location error. A further embodiment may also utilize the gradient functions in conjunction with a model (e.g., noise, multipath, etc.) to calculate the statistics of the location error. In another embodiment, the determination of an expected accuracy may be a function of a rate at which a correlation between adjacent NMR data vectors decay over distance. An exemplary correction may be, but is not limited to, a scalar function. In another embodiment, a gradient of the scalar function may also be an indicator of error in the expected accuracy.

Figure 33:
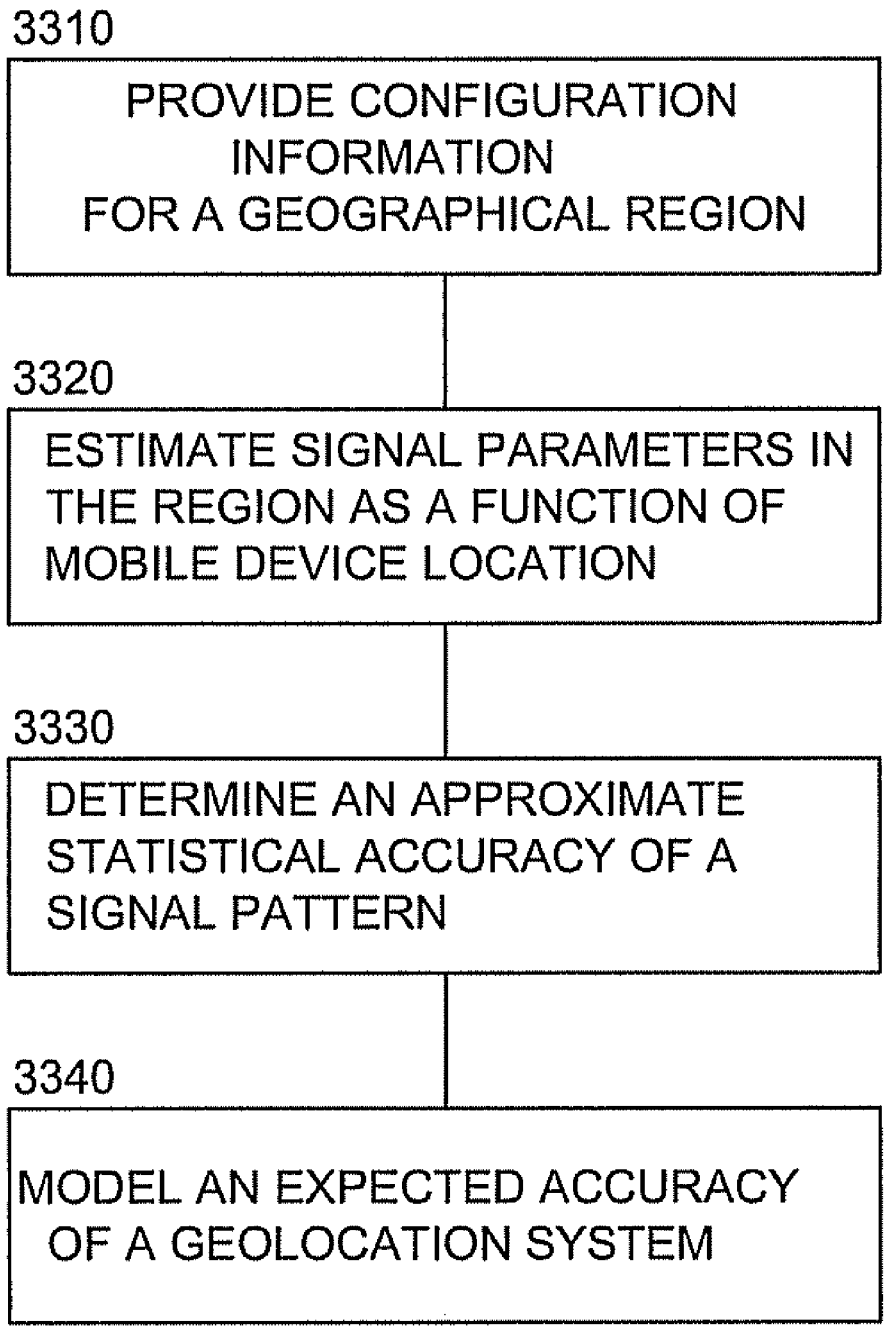
FIGS. 33-35 are flow charts for methods for generating a model for deployment of a geolocation system in a geographic region according to embodiments of the present subject matter.

FIG. 33 is a flow chart for a method for generating a model for deployment of a geolocation system in a geographic region according to an embodiment of the present subject matter. With reference to FIG. 33, at block 3310, configuration information for the geographic region may be provided and at block 3320, signal parameters in the region may be estimated as a function of mobile device location in the region. Exemplary configuration information may be, but is not limited to, cell site locations, number of sectors, sector azimuths, sector antenna beam-widths, antenna heights, antenna down-tilts, downlink control channel transmit powers, a state of a network serving the mobile device, a list of cells neighboring a cell serving the mobile device, a quantity that is a function of a power level of one or more cells neighboring a cell serving the mobile device, an identity of a cell or a sector serving the mobile device, terrain map information for RF signal path loss modeling, and combinations thereof. At block 3330, an approximate statistical accuracy of a signal pattern may be determined as a function of the estimated signal parameters in the region. An expected accuracy of the geolocation system in the region may then be modeled as a function of the configuration information and the determined approximate statistical accuracy.

Figure 34:
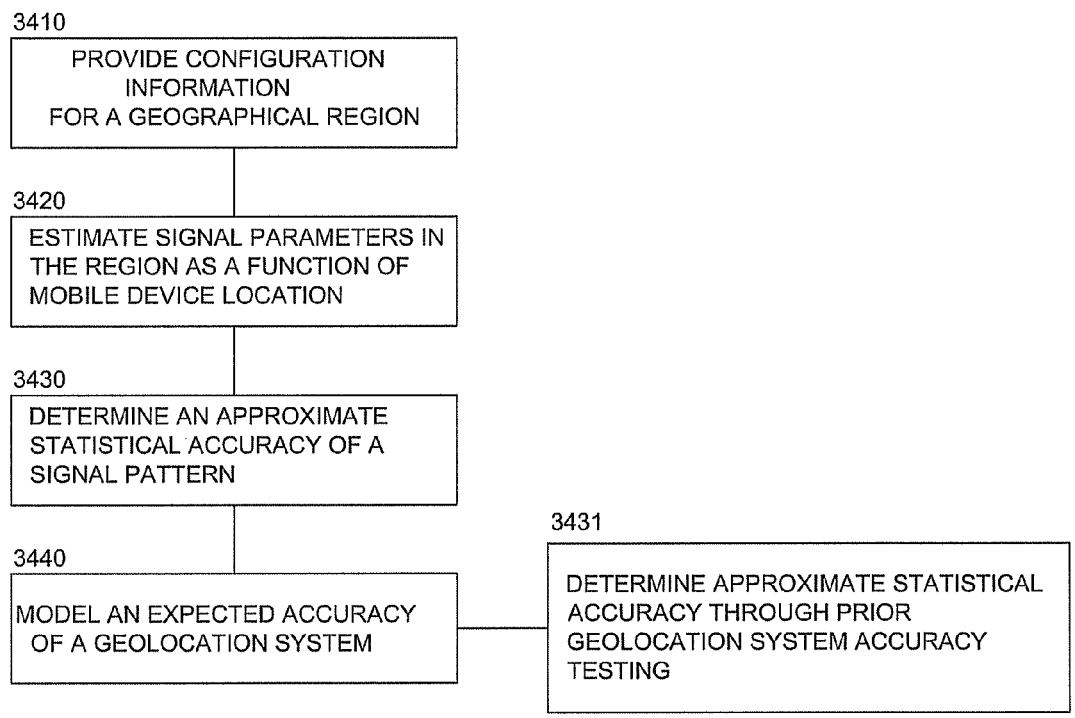

FIG. 34 is a flow chart for a method for generating a model for deployment of a geolocation system in a geographic region according to another embodiment of the present subject matter. Here, blocks 3410, 3420, 3430 and 3440 are similar to blocks 3310, 3320, 3330 and 3340, respectively. With reference to FIG. 34, an approximate statistical accuracy may be determined through prior geolocation system accuracy testing in one embodiment.

Figure 35:
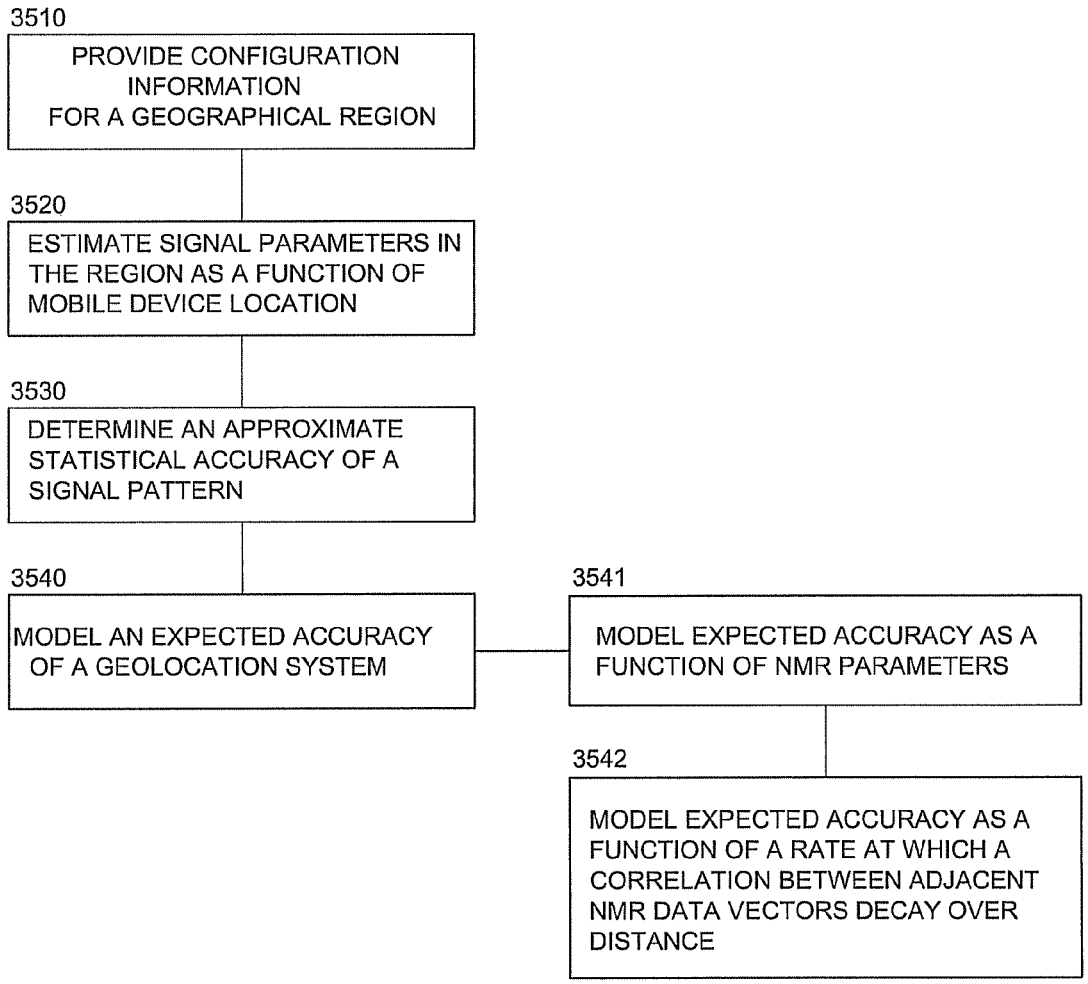

FIG. 35 is a flow chart for a method for generating a model for deployment of a geolocation system in a geographic region according to an additional embodiment of the present subject matter. Here, blocks 3510, 3520, 3530 and 3540 are similar to blocks 3310, 3320, 3330 and 3340, respectively. With reference to FIG. 35, the modeling of an expected accuracy may further comprise modeling an expected accuracy as a function of at least one NMR parameter at block 3541. Exemplary NMR parameters may be, but are not limited to signal strength, round trip time, timing advance, time difference of arrival, the identification of a serving cell or serving sector of a mobile device in the geographic region, a state of a wireless network serving the mobile device, and combinations thereof. In one embodiment, at block 3542, the expected accuracy may be modeled as a function of a rate at which a correlation between adjacent NMR data vectors decay over distance. An exemplary correlation may be, but is not limited to, a scalar function and a gradient of the scalar function may also be an indicator of error in the expected accuracy. By way of further example, a relationship of the gradient to the location error may be determined empirically or through calculation on calibration data or calculation on NUG/UG characteristics. An empirical result may, for example, be derived from knowledge of actual observed location errors and actual computed gradients for a set of grid points in some geographical region. Direct methods of calculation may, for example, examine the gradient functions so obtained at a set of grid points (NUGs or UGs) to calculate the statistics of the location error (with or without a model (e.g., noise, multipath, etc.)).

FIG. 36 is a flow chart for a method of determining an expected location accuracy of a geolocation system in a geographic region according to an embodiment of the present subject matter. With reference to FIG. 36, at block 3610 configuration information may be provided for a geographic region and at block 3620 one or more expected characterizing parameters of a NMR associated with a hypothetical mobile device may be estimated at each of one or more grid points in the geographic region. Exemplary configuration information may be, but is not limited to, cell site locations, number of sectors, sector azimuths, sector antenna beam-widths, antenna heights, antenna down-tilts, downlink control channel transmit powers, a state of a network serving the mobile device, a list of cells neighboring a cell serving the mobile device, a quantity that is a function of a power level of one or more cells neighboring a cell serving the mobile device, an identity of a cell serving the mobile device, an identity of a sector serving the mobile device, terrain map information for RF signal path loss modeling, and combinations thereof. Further, exemplary characterizing parameters may be, but are not limited to, signal strength, round trip time, timing advance, time difference of arrival, the identification of a serving cell or serving sector of a mobile device in the geographic region, a state of a wireless network serving the mobile device, and combinations thereof. At block 3630 an expected accuracy of the geolocation system in the geographic region may be determined as a function of at least one estimated parameter. Of course, any one or plural grid points may be located on a predetermined fixed uniform grid defined over the geographic region, and any one or plural grid points may be randomly located within the geographic region.

Figure 37:
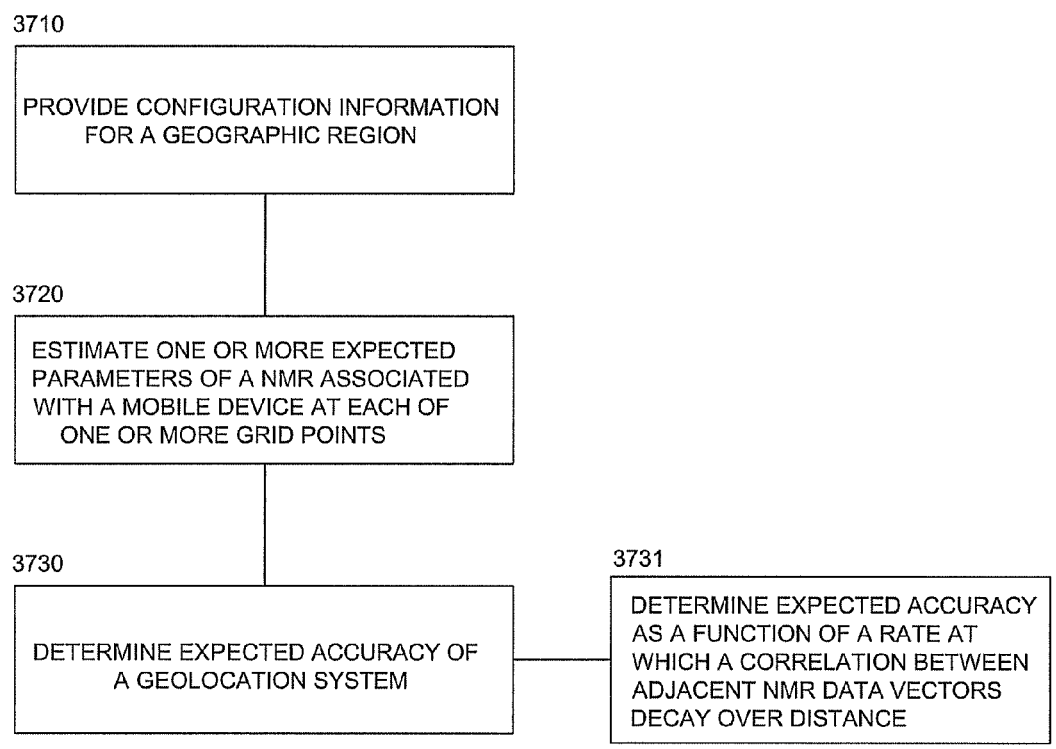

FIG. 37 is a flow chart for a method of determining an expected location accuracy of a geolocation system in a geographic region according to an additional embodiment of the present subject matter. Here, blocks 3710, 3720 and 3730 are similar to blocks 3610, 3620 and 3630, respectively. With reference to FIG. 37, an expected accuracy may be determined as a function of a rate at which a correlation between adjacent NMR data vectors decay over distance. An exemplary correlation may be, but is not limited to, a scalar function and a gradient of the scalar function may also be an indicator of error in the expected accuracy.

As shown by the various configurations and embodiments illustrated in FIGS. 1-37, a method and system for predicting location accuracy for a mobile unit have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method of predicting an expected accuracy of a location system in a geographic region comprising the steps of:
(a) providing configuration information for the geographic region;
(b) estimating signal reception in the region as a function of mobile device location in the region;
(c) determining an approximate statistical accuracy of a signal strength pattern as a function of the estimated signal reception in the region; and
(d) modeling an expected accuracy of the location system in the region as a function of the configuration information, determined approximate statistical accuracy, and at least one network measurement report ("NMR") parameter,
wherein for each of select ones of said NMRs the NMRs include plural data vectors and the step of modeling an expected accuracy of the geolocation system further comprises modeling an expected accuracy as a function of a rate at which a correlation between adjacent NMR data vectors decay over distance, and
wherein the correlation is a scalar function and a gradient of the scalar function is an indicator of error in the expected accuracy.

2. The method of claim 1 wherein said configuration information is selected from the group consisting of: cell site locations, number of sectors, sector azimuths, sector antenna beam-widths, antenna heights, antenna down-tilts, downlink control channel transmit powers, a state of a network serving said mobile device, a list of cells neighboring a cell serving said mobile device, a quantity that is a function of a power level of one or more cells neighboring a cell serving said mobile device, an identity of a cell serving said mobile device, an identity of a sector serving said mobile device, terrain map information for RF signal path loss modeling, and combinations thereof.

3. The method of claim 1 wherein determining an approximate statistical accuracy further comprises determining an approximate statistical accuracy through prior location system accuracy testing.

4. The method of claim 1 wherein the geographic region is a deployment region.

5. A method of assigning geographical coordinates to a calibration point located in a geographic region for the location of a mobile device comprising the steps of:
 (a) providing configuration information for a geographic region;
 (b) estimating one or more expected characterizing parameters of a network measurement report ("NMR") associated with a hypothetical mobile device at each of one or more calibration points in the geographic region;
 (c) for each of said calibration points:
  (i) evaluating the expected characterizing parameters;
  (ii) determining if at least one grid point should be defined based on said evaluation; and
  (iii) assigning geographical coordinates to said at least one calibration point; and
 (d) determining an expected accuracy of a geolocation system in the geographic region as a function of the configuration information and an approximate statistical accuracy,
 wherein for each of select ones of said NMRs the NMRs include plural data vectors and the step of determining an expected accuracy of the geolocation system further comprises determining an expected accuracy as a function of a rate at which a correlation between adjacent NMR data vectors decay over distance, and
 wherein the correlation is a scalar function and a gradient of the scalar function is an indicator of error in the expected accuracy.

6. The method of claim 5 wherein one of said calibration points is located on a predetermined fixed uniform grid defined over said geographic region.

7. The method of claim 5 wherein one of said calibration points is randomly located within said geographic region.

8. The method of claim 5 wherein said configuration information is selected from the group consisting of: cell site locations, number of sectors, sector azimuths, sector antenna beam-widths, antenna heights, antenna down-tilts, downlink control channel transmit powers, a state of a network serving said mobile device, a list of cells neighboring a cell serving said mobile device, a quantity that is a function of a power level of one or more cells neighboring a cell serving said mobile device, an identity of a cell serving said mobile device, an identity of a sector serving said mobile device, terrain map information for RF signal path loss modeling, and combinations thereof.

9. The method of claim 5 wherein said characterizing parameters are selected from the group consisting of: signal strength, signal quality, round trip time, timing advance, time difference of arrival, the identification of a serving cell or serving sector of a mobile device in the geographic region, a state of a wireless network serving the mobile device, and combinations thereof.

10. A method for generating a model for deployment of a geolocation system in a geographic region comprising the steps of:
 (a) providing configuration information for the geographic region;
 (b) estimating signal parameters in the region as a function of mobile device location in the region;
 (c) determining an approximate statistical accuracy of a signal pattern as a function of the estimated signal parameters in the region; and
 (d) modeling an expected accuracy of the geolocation system in the region as a function of the configuration information, determined approximate statistical accuracy, and at least one network measurement report ("NMR") parameter,
 wherein for each of select ones of said NMRs the NMRs include plural data vectors and the step of modeling an expected accuracy of the geolocation system further comprises modeling an expected accuracy as a function of a rate at which a correlation between adjacent NMR data vectors decay over distance, and
 wherein the correlation is a scalar function and a gradient of the scalar function is an indicator of error in the expected accuracy.

11. The method of claim 10 wherein said configuration information is selected from the group consisting of: cell site locations, number of sectors, sector azimuths, sector antenna beam-widths, antenna heights, antenna down-tilts, downlink control channel transmit powers, a state of a network serving said mobile device, a list of cells neighboring a cell serving said mobile device, a quantity that is a function of a power level of one or more cells neighboring a cell serving said mobile device, an identity of a cell or a sector serving said mobile device, terrain map information for RF signal path loss modeling, and combinations thereof.

12. The method of claim 10 wherein determining an approximate statistical accuracy further comprises determining an approximate statistical accuracy through prior geolocation system accuracy testing.

13. The method of claim 10 wherein said NMR parameters are selected from the group consisting of: signal strength, signal quality, round trip time, timing advance, time difference of arrival, the identification of a serving cell or serving sector of a mobile device in the geographic region, a state of a wireless network serving the mobile device, and combinations thereof.

14. A method of determining an expected location accuracy of a geolocation system in a geographic region comprising the steps of:
 (a) providing configuration information for a geographic region;
 (b) estimating one or more expected characterizing parameters of a network measurement report ("NMR") associated with a hypothetical mobile device at each of one or more grid points in the geographic region; and
 (c) determining an expected accuracy of the geolocation system in the geographic region as a function of at least one estimated parameter,
 wherein for each of select ones of said NMRs the NMRs include plural data vectors and the step of determining an expected accuracy of the geolocation system further comprises determining an expected accuracy as a function of a rate at which a correlation between adjacent NMR data vectors decay over distance, and
 wherein the correlation is a scalar function and a gradient of the scalar function is an indicator of error in the expected accuracy.

15. The method of claim 14 wherein one of said grid points is located on a predetermined fixed uniform grid defined over said geographic region.

16. The method of claim 14 wherein one of said grid points is randomly located within said geographic region.

17. The method of claim 14 wherein said configuration information is selected from the group consisting of: cell site locations, number of sectors, sector azimuths, sector antenna beam-widths, antenna heights, antenna down-tilts, downlink control channel transmit powers, a state of a network serving said mobile device, a list of cells neighboring a cell serving said mobile device, a quantity that is a function of a power level of one or more cells neighboring a cell serving said mobile device, an identity of a cell serving said mobile device, an identity of a sector serving said mobile device, terrain map information for RF signal path loss modeling, and combinations thereof.

18. The method of claim 14 wherein said parameters are selected from the group consisting of: signal strength, signal quality, round trip time, timing advance, time difference of arrival, the identification of a serving cell or serving sector of a mobile device in the geographic region, a state of a wireless network serving the mobile device, and combinations thereof.

* * * * *